(12) United States Patent
Benson

(10) Patent No.: US 7,941,433 B2
(45) Date of Patent: May 10, 2011

(54) SYSTEM AND METHOD FOR MANAGING CONTEXT-RICH DATABASE

(75) Inventor: Gregory P. Benson, Rancho Santa Fe, CA (US)

(73) Assignee: Glenbrook Associates, Inc., Del Mar, CA (US)

( * ) Notice: Subject to any disclaimer, the term of this patent is extended or adjusted under 35 U.S.C. 154(b) by 367 days.

(21) Appl. No.: 11/656,885

(22) Filed: Jan. 22, 2007

(65) Prior Publication Data

US 2008/0033951 A1    Feb. 7, 2008

Related U.S. Application Data

(60) Provisional application No. 60/760,729, filed on Jan. 20, 2006, provisional application No. 60/760,751, filed on Jan. 20, 2006.

(51) Int. Cl.
*G06F 17/30* (2006.01)

(52) U.S. Cl. .................................. 707/737; 707/748

(58) Field of Classification Search .................. 707/1–5, 707/10, 100–102, 104.1
See application file for complete search history.

(56) References Cited

U.S. PATENT DOCUMENTS

| | | | |
|---|---|---|---|
| 5,359,724 A | 10/1994 | Earle | |
| 5,647,058 A | 7/1997 | Agrawal et al. | |
| 5,721,910 A | 2/1998 | Unger et al. | |
| 5,752,243 A | 5/1998 | Reiter et al. | |
| 5,918,232 A | 6/1999 | Pouschine et al. | |
| 5,937,408 A | 8/1999 | Shoup et al. | |
| 6,073,134 A | 6/2000 | Shoup et al. | |
| 6,108,657 A | 8/2000 | Shoup et al. | |
| 6,175,835 B1 | 1/2001 | Shadmon | |
| 6,208,993 B1 | 3/2001 | Shadmon | |
| 6,460,036 B1 * | 10/2002 | Herz ............................... 707/10 |
| 6,625,611 B1 | 9/2003 | Teig et al. | |
| 6,675,159 B1 | 1/2004 | Lin et al. | |
| 6,701,306 B1 | 3/2004 | Kronmiller et al. | |
| 6,712,763 B2 | 3/2004 | Abraham-Fuchs et al. | |
| 6,712,863 B2 | 3/2004 | Steckelberg et al. | |
| 6,766,316 B2 | 7/2004 | Caudill et al. | |
| 6,801,908 B1 | 10/2004 | Fuloria et al. | |
| 6,850,252 B1 | 2/2005 | Hoffberg | |

(Continued)

FOREIGN PATENT DOCUMENTS

WO    WO 2007/084790 A2    7/2007

(Continued)

OTHER PUBLICATIONS

Office Action dated Jan. 9, 2009 for U.S. Appl. No. 11/625,761 (GLNBK.008A).

(Continued)

*Primary Examiner* — Cam-Linh Nguyen
(74) *Attorney, Agent, or Firm* — Knobbe Martens Olson & Bear, LLP

(57) ABSTRACT

A system and method for maintaining a data cluster of records referring to a same object or phenomenon in a context-rich database are provided. The method comprises assessing each record of the data cluster entered by a source on a predetermined number of parameters to develop a quality score for the source. The method further comprises assessing each field of a record entered by the source on parameters related to quality or performance of the data. The method further comprises storing one or more scores based on the assessments so as to enhance answering requests about a portion of the database.

14 Claims, 22 Drawing Sheets

QUALITATIVE ASSESSMENT MODULE

U.S. PATENT DOCUMENTS

| | | | |
|---|---|---|---|
| 6,873,914 B2 | 3/2005 | Winfield et al. | |
| 6,877,013 B1 | 4/2005 | Kronmiller et al. | |
| 6,883,136 B1 | 4/2005 | Weinberg et al. | |
| 6,889,107 B2 | 5/2005 | Yuda et al. | |
| 6,931,418 B1 | 8/2005 | Barnes | |
| 6,952,700 B2 | 10/2005 | Modha et al. | |
| 6,959,304 B1 | 10/2005 | Teig et al. | |
| 6,963,867 B2* | 11/2005 | Ford et al. | 707/3 |
| 6,965,900 B2 | 11/2005 | Srinivasa et al. | |
| 6,988,109 B2 | 1/2006 | Stanley et al. | |
| 6,996,793 B1 | 2/2006 | Kronmiller et al. | |
| 7,007,301 B2 | 2/2006 | Crosbie et al. | |
| 7,016,910 B2 | 3/2006 | Egilsson | |
| 7,027,055 B2 | 4/2006 | Anderson | |
| 7,054,493 B2 | 5/2006 | Schwartz | |
| 7,055,142 B2 | 5/2006 | Meredith | |
| 7,072,883 B2 | 7/2006 | Potok | |
| 7,085,683 B2 | 8/2006 | Anderson | |
| 7,143,091 B2 | 11/2006 | Charnock | |
| 7,243,112 B2 | 7/2007 | Qu | |
| 7,250,944 B2 | 7/2007 | Anderson | |
| 7,272,597 B2 | 9/2007 | Chowdhury | |
| 7,293,010 B2 | 11/2007 | Angele | |
| 7,302,420 B2 | 11/2007 | Aggarwal | |
| 7,315,858 B2 | 1/2008 | Potok | |
| 7,332,281 B2 | 2/2008 | Morris | |
| 7,333,970 B2 | 2/2008 | Angele | |
| 7,337,170 B2 | 2/2008 | Lee | |
| 7,340,485 B2 | 3/2008 | Varpela | |
| 7,349,896 B2 | 3/2008 | Chowdhury | |
| 7,373,612 B2 | 5/2008 | Risch | |
| 7,428,517 B2 | 9/2008 | Brands | |
| 7,472,137 B2 | 12/2008 | Edelstein | |
| 7,480,535 B2 | 1/2009 | Kranner | |
| 7,487,166 B2 | 2/2009 | Angele | |
| 7,493,333 B2 | 2/2009 | Hill | |
| 7,496,561 B2 | 2/2009 | Caudill | |
| 7,496,593 B2 | 2/2009 | Gardner | |
| 7,505,989 B2 | 3/2009 | Gardner | |
| 7,533,069 B2 | 5/2009 | Fairweather | |
| 7,533,124 B2 | 5/2009 | Hellman | |
| 2002/0002502 A1 | 1/2002 | Maes | |
| 2002/0010679 A1 | 1/2002 | Felsher | |
| 2002/0194379 A1* | 12/2002 | Bennett et al. | 709/246 |
| 2003/0009295 A1 | 1/2003 | Markowitz | |
| 2003/0088481 A1 | 5/2003 | Elias | |
| 2003/0115188 A1 | 6/2003 | Srinivasa | |
| 2003/0171876 A1 | 9/2003 | Markowitz | |
| 2003/0229451 A1 | 12/2003 | Hamilton | |
| 2004/0002842 A1 | 1/2004 | Woessner | |
| 2004/0003132 A1 | 1/2004 | Stanley | |
| 2004/0018500 A1 | 1/2004 | Glassbrook | |
| 2004/0018501 A1 | 1/2004 | Allen | |
| 2004/0019429 A1 | 1/2004 | Coffin | |
| 2004/0019430 A1 | 1/2004 | Hurban | |
| 2004/0023295 A1 | 2/2004 | Hamilton | |
| 2004/0024293 A1 | 2/2004 | Lawrence | |
| 2004/0024543 A1 | 2/2004 | Zhang | |
| 2004/0024773 A1 | 2/2004 | Stoffel | |
| 2004/0030741 A1 | 2/2004 | Wolton | |
| 2004/0034633 A1* | 2/2004 | Rickard | 707/5 |
| 2004/0034795 A1 | 2/2004 | Anderson | |
| 2004/0059436 A1 | 3/2004 | Anderson | |
| 2004/0103090 A1 | 5/2004 | Dogl | |
| 2005/0010370 A1 | 1/2005 | Varpela | |
| 2005/0010373 A1 | 1/2005 | Varpela | |
| 2005/0060297 A1* | 3/2005 | Najork | 707/3 |
| 2005/0060305 A1 | 3/2005 | Hopkins | |
| 2005/0065733 A1 | 3/2005 | Caron | |
| 2005/0097111 A1 | 5/2005 | Mukherjee | |
| 2005/0108001 A1 | 5/2005 | Aarskog | |
| 2005/0108267 A1* | 5/2005 | Gibson et al. | 707/101 |
| 2005/0128201 A1 | 6/2005 | Warner | |
| 2005/0144162 A1 | 6/2005 | Liang | |
| 2005/0154723 A1 | 7/2005 | Liang | |
| 2005/0160107 A1 | 7/2005 | Liang | |
| 2005/0165566 A1 | 7/2005 | Happel | |
| 2005/0177545 A1 | 8/2005 | Buco | |
| 2005/0192756 A1 | 9/2005 | Varpela | |
| 2005/0198333 A1 | 9/2005 | Dinges | |
| 2005/0200077 A1 | 9/2005 | Brian | |
| 2005/0203931 A1 | 9/2005 | Pingree | |
| 2005/0210008 A1 | 9/2005 | Tran | |
| 2005/0267869 A1 | 12/2005 | Horvitz | |
| 2005/0273697 A1 | 12/2005 | Weinberg | |
| 2005/0278323 A1 | 12/2005 | Horvitz | |
| 2005/0278326 A1 | 12/2005 | Horvitz | |
| 2006/0004705 A1 | 1/2006 | Horvitz | |
| 2006/0004763 A1 | 1/2006 | Horvitz | |
| 2006/0026203 A1 | 2/2006 | Tan | |
| 2006/0047649 A1 | 3/2006 | Liang | |
| 2006/0053099 A1 | 3/2006 | Gardner | |
| 2006/0053135 A1 | 3/2006 | Beaumont | |
| 2006/0053171 A1 | 3/2006 | Eldridge | |
| 2006/0053172 A1 | 3/2006 | Gardner | |
| 2006/0053173 A1 | 3/2006 | Gardner | |
| 2006/0053174 A1 | 3/2006 | Gardner | |
| 2006/0053175 A1 | 3/2006 | Gardner | |
| 2006/0053382 A1 | 3/2006 | Gardner | |
| 2006/0064694 A1 | 3/2006 | Messer | |
| 2006/0070428 A1 | 4/2006 | Bateson | |
| 2006/0074632 A1 | 4/2006 | Nanavati | |
| 2006/0074832 A1 | 4/2006 | Gardner | |
| 2006/0074833 A1 | 4/2006 | Gardner | |
| 2006/0074836 A1 | 4/2006 | Gardner | |
| 2006/0074900 A1 | 4/2006 | Nanavati | |
| 2006/0074980 A1 | 4/2006 | Sarkar | |
| 2006/0074991 A1 | 4/2006 | Lussier | |
| 2006/0075013 A1 | 4/2006 | Hite | |
| 2006/0080428 A1 | 4/2006 | Trossen et al. | |
| 2006/0106793 A1 | 5/2006 | Liang | |
| 2006/0106876 A1 | 5/2006 | MacGregor | |
| 2006/0116994 A1 | 6/2006 | Jonker | |
| 2006/0123027 A1 | 6/2006 | Kohlhammer | |
| 2006/0129843 A1 | 6/2006 | Srinivasa | |
| 2006/0136194 A1 | 6/2006 | Armstrong | |
| 2006/0143159 A1 | 6/2006 | Chowdhury | |
| 2006/0149573 A1 | 7/2006 | Hoffman | |
| 2006/0154250 A1 | 7/2006 | Morris | |
| 2006/0156253 A1 | 7/2006 | Schreiber | |
| 2006/0161655 A1 | 7/2006 | Altenhofen | |
| 2006/0166213 A1 | 7/2006 | Morris | |
| 2006/0167784 A1 | 7/2006 | Hoffberg | |
| 2006/0167931 A1 | 7/2006 | Bobick | |
| 2006/0173817 A1 | 8/2006 | Chowdhury | |
| 2006/0173838 A1 | 8/2006 | Garg | |
| 2006/0178862 A1 | 8/2006 | Chan | |
| 2006/0184483 A1 | 8/2006 | Clark | |
| 2006/0206883 A1 | 9/2006 | Sabbouh | |
| 2006/0212486 A1 | 9/2006 | Kennis | |
| 2006/0212487 A1 | 9/2006 | Kennis | |
| 2006/0212836 A1 | 9/2006 | Khushraj | |
| 2006/0218177 A1 | 9/2006 | Chang | |
| 2006/0223131 A1 | 10/2006 | Schweitzer | |
| 2006/0228710 A1 | 10/2006 | Morris | |
| 2006/0230033 A1 | 10/2006 | Halevy | |
| 2006/0242101 A1 | 10/2006 | Akkiraju | |
| 2006/0248045 A1 | 11/2006 | Toledano | |
| 2006/0248458 A1 | 11/2006 | Li | |
| 2006/0253431 A1 | 11/2006 | Bobick | |
| 2006/0259813 A1 | 11/2006 | Ushijima | |
| 2006/0271556 A1 | 11/2006 | Mukherjee | |
| 2006/0282339 A1 | 12/2006 | Musgrove | |
| 2007/0005621 A1 | 1/2007 | Lesh | |

FOREIGN PATENT DOCUMENTS

WO    WO 2007/084791 A2    7/2007

OTHER PUBLICATIONS

Office Action dated Sep. 18, 2009 for U.S. Appl. No. 11/625,761 (GLNBK.008A).
IPRP and WO for PCT/US2007/001734, dated Jul. 22, 2008.
ISR and WO for PCT/US2007/001734, dated Jun. 25, 2007.
ISR and WO for PCT/US2007/001735, dated Sep. 6, 2007.
Official Action in European App. No. 07 716 925.8 - 2201, dated Jul. 2, 2008.

Elfeky, M. G. et al., Institute of Electrical and Electronics Engineers, "Tailor: A Record Linkage Toolbox", Proceedings 18$^{th}$ International Conference on Data Engineering (ICDE 2002), Feb. 26, 2002, vol. Conf. 18, Issue XP010588196, pp. 17-28, San Jose, CA, U.S.

Honle, N., et al., Benefits of Integrating Meta Data into a Context Model, Proceedings of the 3$^{rd}$ International Conference on Pervasive Computing and Communications Workshops, 2005, pp. 25-29, IEEE, XP-10779789.

Kontogiannis, K., et al., on the Role of Services in Enterprise Application Integration, Proceedings of the 10$^{th}$ International Workshop on Software Technology and Engineering Practice, 2002, pp. 103-113, IEEE, XP-10582798.

Lei, Hui, Context Awareness: a Practitioner's Perspective, Proceedings of the International Workshop on Ubiquitous Data Management, 2005, pp. 43-52, IEEE, XP-010843657.

Rahm E and Do H-H, Data Cleaning: Problems and Current Approaches, Quarterly Bulletin of the Computer Society of the IEEE Technical Committee on Data Engineering, Dec. 2000, vol. 2000-12, pp. 1-11, Washington D.C., U.S.

Wang, R. et al., Data Quality Requirements Analysis and Modeling, Proceedings of the International Conference on Data Engineering, Apr. 1993, vol. Conf. 9, pp. 670-677, IEEE, XP-10095474.

\* cited by examiner

Sample Template

| | Lable | Field Contents | Type | Path | International | Source | Author | Date | Time | Location | Render level | Value list | Security | Encryption | Version |
|---|---|---|---|---|---|---|---|---|---|---|---|---|---|---|---|
| Identification | Master ID code | | UUID | www.uuid.net | | | | | | | | | | | |
| | Industry code | | ISBN | www.isbn.net | | | | | | | | | | | |
| | Product code | | UPN | www.upn.net | | | | | | | | | | | |
| | Master name | | | | | | | | | | | | | | |
| | Scientific name | | | | | | | | | | | | | | |
| | Common name | | | | | | | | | | | | | | |
| | model number | | | | | | | | | | | | | | |
| | Serial number | | | | | | | | | | | | | | |
| | Address | | | | | | | | | | | | | | |
| | Component of x | | | | | | | | | | | | | | |
| | System of y | | | | | | | | | | | | | | |
| | Valid from date | | | | | | | | | | | | | | |
| | Expiration date | | | | | | | | | | | | | | |
| | Ownership/control | | | | | | | | | | | | | | |
| | Copyright | | | | | | | | | | | | | | |
| Subject | Category 1 | | | | | | | | | | | | | | |
| | Category 2 | | | | | | | | | | | | | | |
| | Category 3 | | | | | | | | | | | | | | |
| | Category 4 | | | | | | | | | | | | | | |
| | Category 5 | | | | | | | | | | | | | | |
| Physical | Height | | | | | | | | | | | | | | |
| | lenght | | | | | | | | | | | | | | |
| | width | | | | | | | | | | | | | | |
| | depth | | | | | | | | | | | | | | |
| | weight | | | | | | | | | | | | | | |
| | Latitude | | | | | | | | | | | | | | |
| | Longitude | | | | | | | | | | | | | | |
| | Substance | | | | | | | | | | | | | | |
| | Formula | | | | | | | | | | | | | | |
| | Atomic mass | | | | | | | | | | | | | | |
| Observable | Photo | | | | | | | | | | | | | | |
| | Video | | | | | | | | | | | | | | |
| | Sound | | | | | | | | | | | | | | |
| | Smell | | | | | | | | | | | | | | |
| | Radar | | | | | | | | | | | | | | |
| | Xray | | | | | | | | | | | | | | |
| | FLIR | | | | | | | | | | | | | | |
| | Infrared | | | | | | | | | | | | | | |
| | temperature | | | | | | | | | | | | | | |
| | Humidity | | | | | | | | | | | | | | |
| Economic | Industry | | | | | | | | | | | | | | |
| | Field | | | | | | | | | | | | | | |
| | Market | | | | | | | | | | | | | | |
| | Manufacturer | | | | | | | | | | | | | | |
| | Distributer | | | | | | | | | | | | | | |
| | Retailer | | | | | | | | | | | | | | |
| | Price | | | | | | | | | | | | | | |
| | Stock leve | | | | | | | | | | | | | | |
| Social | Law | | | | | | | | | | | | | | |
| | Regulation | | | | | | | | | | | | | | |
| | Reporting | | | | | | | | | | | | | | |
| | News | | | | | | | | | | | | | | |

FIG. 8

Source Performance Scorecard

| Entity ID | Recoed ID | Score | | |
|---|---|---|---|---|
| | | Completeness | Integrity | Popularity |
| A | 1001 | 7 | 9 | 8 |
| A | 1002 | 4 | 5 | 4 |
| C | 1003 | 2 | 3 | 3 |
| A | | | | |
| B | | | | |
| B | | | | |
| C | | | | |
| | | | | |
| Running total for A | X | | | |
| Running total for B | Y | | | |
| Running total for C | Z | | | |

FIG. 9

Quality Assessment for All Records in a Data Cluster

| Record nr | Parameter | | | | | | | Score |
|---|---|---|---|---|---|---|---|---|
| | A | B | C | D | E | F | G | |
| 1 | 5 | 5 | 5 | 5 | 0 | 0 | 5 | 25 |
| 2 | 0 | 0 | 5 | 5 | 0 | 5 | 5 | 20 |
| 3 | 5 | 5 | 5 | 5 | 5 | 5 | 5 | 35 |
| 4 | 5 | 5 | 5 | 5 | 5 | 5 | 0 | 30 |
| 5 | 2 | 2 | 5 | 2 | 5 | 4 | 3 | 23 |
| 6 | 1 | 1 | 2 | 5 | 5 | 4 | 1 | 19 |
| 7 | 2 | 2 | 2 | 2 | 5 | 5 | 5 | 23 |
| 8 | 0 | 0 | 0 | 5 | 5 | 0 | 0 | 10 |
| 9 | 5 | 5 | 5 | 5 | 5 | 5 | 5 | 35 |

*FIG. 10*

Mapping Unstructured Data Elements into a Context-rich Data Structure

| | Element 1 | Confidence score 1 | Element 2 | Confidence score 2 | Element 3 | Confidence score 3 | Object Result |
|---|---|---|---|---|---|---|---|
| Primary Source | *** | | X | 9 | | | |
| Secondary Source | | | | | | | |
| 1 | | | X | 8 | | | |
| 2 | | | Y | 5 | | | |
| 3 | | | X | 8 | | | |
| n | | | | | | | |
| Secondary Source | | | X | 25 | | | |
| Parallel Syntax | | | | | | | |
| 1 | | | AA | 7 | | | |
| 2 | | | BB | 9 | | | |
| 3 | | | CC | 5 | | | |
| n | | | | | | | |
| Syntax Result | | | AA-BB-CC | 21 | | | |
| Template Reference | | | | | | | |
| 1 | | | MM | 9 | | | |
| 2 | | | NN | 4 | | | |
| 3 | | | PP | 2 | | | |
| n | | | | | | | |
| Template Result | | | MM | 9 | | | |
| Element Result | | | X-AA-BB-CC-MM | | | | |

FIG. 12

Sample Request Message Format

Requestor ID Code
Template ID Code
Response ID Code
Query expression
Source quality range
Render level preference

FIG. 13

SYSTEM AND METHOD FOR MANAGING CONTEXT-RICH DATABASE

CROSS REFERENCE TO RELATED APPLICATIONS

This application claims priority under 35 U.S.C. Section 119(e) to U.S. provisional patent application No. 60/760,729 filed on Jan. 20, 2006 entitled "SYSTEM AND METHOD FOR INFORMATION RETRIEVAL", and to U.S. Provisional Patent Application No. 60/760,751 filed on Jan. 20, 2006 entitled "SYSTEM AND METHOD FOR STANDARDIZING THE DESCRIPTION OF INFORMATION", both of which are incorporated herein by reference.

This application is related to U.S. application Ser. No. 11/625,761, filed on the same day herewith and titled "SYSTEM AND METHOD FOR CONTEXT-RICH DATABASE OPTIMIZED FOR PROCESSING OF CONCEPTS" which is hereby incorporated by reference.

BACKGROUND

1. Field of the Invention

The invention relates to databases, and in particular, to a multi-contextual, multi-dimensional database optimized for processing of concepts.

2. Description of the Related Technology

Conventional databases are typically designed with a single purpose in mind, within a closed system. There is a growing interest in the marketplace to share data in order to have multiple systems interoperate and, in some cases, benefit from a larger body of experience. FIG. 1A illustrates the limited record/field structure of a conventional database record and the limited number of associations possible from records lacking contextual robustness and depth.

Much research has been done over the years to solve the challenge of a uniform representation of human knowledge. Solutions ranging from fixed taxonomies and ontologies to the more recent specification for the Semantic Web have made noble attempts at overcoming these challenges, but important gaps remain. Persistent problems can be summarized as follows:

1. Knowledge is created, recorded, transmitted, interpreted and classified by different people in different languages with different biases and using different methodologies thus resulting in inaccuracies and inconsistencies.
2. The vast majority of knowledge is expressed in free-form prose language convenient for human interpretation but lacking the structure and consistency needed for accurate machine processing. Current knowledge tends to be represented in a one-dimensional expression where the author makes a number of assumptions about the interpreter.
3. There is no international standard or guideline for expressing the objects and ideas in our world and therefore no way to reconcile the myriad ways a single idea may be represented.
4. As a result of the foregoing, the vast majority of information/knowledge in existence today is either inaccurate, incomplete or both. As a result, true industry-wide or global collaboration on projects ranging from drug discovery to homeland security is effectively prevented.
5. There are several reasons for this shortcoming: a) very few people have the training of an Information Scientist capable of capturing the multidimensional complexity of knowledge; and b) even with such training, the process has been extremely onerous and slow using current methods.
6. Compounding on these challenges is the fact that both new knowledge creation and the velocity of change is increasing exponentially.
7. Even though an abundance of sophisticated database technology is available today, improved data mining and analysis is impossible until the quality and integrity of data can be resolved.

SUMMARY OF CERTAIN INVENTIVE ASPECTS

The system, method, and devices of the invention each have several aspects, no single one of which is solely responsible for its desirable attributes. Without limiting the scope of this invention, its more prominent features will now be briefly discussed.

In one aspect, there is a computer-implemented method for maintaining a data cluster of records referring to a same object or phenomenon in a context-rich database is provided. The method comprises assessing each record of the data cluster entered by a source on a predetermined number of parameters to develop a quality score for the source. The method further comprises assessing each field of a record entered by the source on parameters related to quality or performance of the data. The method further comprises storing one or more scores based on the assessments so as to enhance answering requests about a portion of the database.

In another aspect, there is a computer-implemented method of evaluating a message from an external computing system requesting a reply containing some portion of a context-rich database. The method comprises receiving a message from an external computing system requesting a reply containing some portion of a context-rich database, wherein the message comprises at least a requestor identification. The method further comprises determining whether the requestor has rights to access the information identified by the query expression. The method further comprises providing the information identified by the query expression for which the requestor has rights and that matches the source quality range.

In another aspect, there is a computer-implemented method of processing records in a context-rich database. The method comprises evaluating all records in the database that are associated with a same phenomenon or object. The method further comprises applying user preferences corresponding with a user request. The method further comprises determining the records in the database that best satisfy the user request.

In another aspect, there is a computer-implemented system for maintaining a data cluster of records referring to a same object or phenomenon in a context-rich database. The system comprises means for assessing each record of the data cluster entered by a source on a predetermined number of parameters to develop a quality score for the source. The system further comprises means for assessing each field of a record entered by the source on parameters related to quality or performance of the data. The system further comprises means for storing one or more scores based on the assessments so as to enhance answering requests about a portion of the database.

In another aspect, there is a computer-implemented system for evaluating a message from an external computing system requesting a reply containing some portion of a context-rich database. The system comprises means for receiving a message from an external computing system requesting a reply containing some portion of a context-rich database, wherein the message comprises at least a requestor identification. The system further comprises means for determining whether the requestor has rights to access the information identified by the query expression. The system further comprises means for providing the information identified by the query expression for which the requestor has rights and that matches the source quality range.

In another aspect, there is a computer-implemented system for processing records in a context-rich database. The system comprises means for evaluating all records in the database that are associated with a same phenomenon or object. The system further comprises means for applying user preferences corresponding with a user request. The system further comprises means for determining the records in the database that best satisfy the user request.

In another aspect, there is a computer-implemented system for maintaining a data cluster of records referring to a same object or phenomenon in a context-rich database. The system comprises a memory. The system further comprises a processor configured to 1) assess each record of the data cluster entered by a source on a predetermined number of parameters to develop a quality score for the source; 2) assess each field of a record entered by the source on parameters related to quality or performance of the data; and 3) store one or more scores based on the assessments so as to enhance answering requests about a portion of the database.

In another aspect, there is a computer-implemented system for evaluating a message from an external computing system requesting a reply containing some portion of a context-rich database. The system comprises a memory. The system further comprises a processor configured to 1) receive a message from an external computing system requesting a reply containing some portion of a context-rich database, wherein the message comprises at least a requestor identification; 2) determine whether the requestor has rights to access the information identified by the query expression; and 3) provide the information identified by the query expression for which the requestor has rights and that matches the source quality range.

In another aspect, there is a computer-implemented system for processing records in a context-rich database. The system comprises a memory. The system further comprises a processor configured to 1) evaluate all records in the database that are associated with a same phenomenon or object; 2) apply user preferences corresponding with a user request; and 3) determine the records in the database that best satisfy the user request.

BRIEF DESCRIPTION OF THE DRAWINGS

FIG. 8 is an example of the subject-specific template.

FIG. 9 is an example illustrating the process of calculating a qualitative score for each entity based on all records associated with that entity.

FIG. 10 is an example illustrating the process of calculating a qualitative score for each record based on all parameters included in that record.

FIG. 12 is an example illustrating a table which may be used in the process of mapping unstructured data into a context-rich data structure.

FIG. 13 is an example of a user query message.

DETAILED DESCRIPTION OF CERTAIN INVENTIVE EMBODIMENTS

Figure 1:
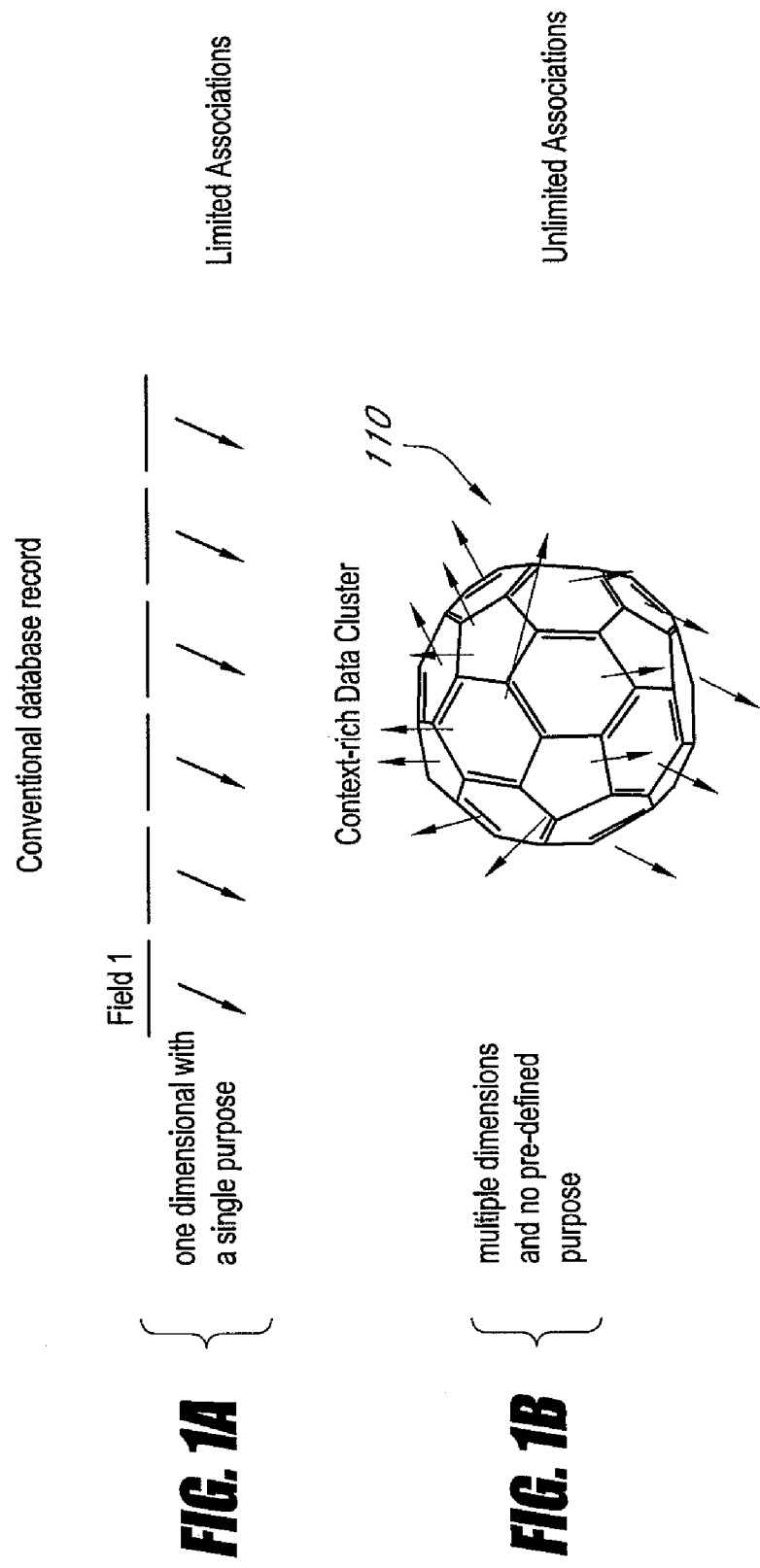
FIG. 1A is a diagram showing a conventional database record which is inherently designed for a very narrow purpose and therefore is limited in its ability to provide value in data mining.
FIG. 1B is a diagram of a contextual data cluster or repository which contains broad contextual information.

The following detailed description of certain embodiments presents various descriptions of specific embodiments of the invention. However, the invention can be embodied in a multitude of different ways as defined and covered by the claims. In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

This system builds on the premise that mankind will never agree on a single definition of anything. Broad collaboration will always result in a multitude of data sets describing the same experiment or object—each claiming to be the definitive representation. Likewise, there will always be a multitude of definitions or classifications each vying to be the authority. The prevailing approach to database design or data mining today is to restrict input data sources as a means of overcoming this problem. As a result, not only do designers unwittingly introduce a bias that affects all system results, but they effectively ignore the inherent volatility of information: it is in a constant state of update, addition and revision.

In contrast, the system and method described herein embraces the aforementioned social and cultural aberrations by describing a system that performs the equivalent of an Esperanto language, optimized for machine rather than human processing of complex, imperfect data sets. Further, the system provides a logical mechanism for storing a multitude of related versions of a concept and the means for resolving disparities in a common fashion, thus constricting ambiguity to a minimum. The potential benefits from this invention are immeasurable. Traditionally, researchers have been largely relegated to data mining information generated within their own limited domain without the benefit of understanding the related successes and failures of other comparable international efforts. This system provides a foundation for the creation and maintenance of a single body of human knowledge and experience—thus increasing by several orders of magnitude, the velocity and efficiency of innovation and learning.

The system is focused on solving the Achilles heel of machine analysis of knowledge—the creation of a universal knowledge repository, such as a multidimensional, context-rich database or data structure, that reflects the nature of the real world. The system describes methods for taking advantage of the fact that any given concept may be represented in a hundred different ways. Rather than selecting one record as "authoritative" like conventional methods, this system analyzes all the versions in a multi-step process to distill the raw material to a series of unique patterns representing human concepts optimized for machine analysis. Each record is analyzed for its relative context in the source document, subject-matter templates, semantic trees and other source documents to build a statistical model representing the aggregation of all perspectives on the topic. This process effectively produces a single abstracted answer with the highest confidence level.

The system applies to both physical and virtual objects (e.g., a book and a digital file) as well as ideas or language elements (e.g., concepts, nouns, verbs, adjectives). Data records can be imported from, or exported to a multitude of static or linked file formats such as: text, MS Word, hypertext markup language (HTML), extensible markup language (XML), and symbolic link (SYLK). Rather than attempting to force the world into a single view, the system supports multiple perspectives/values for any given object and provides the consumer/user with a way for dynamically setting filters based on variables such as information source, source authority, record robustness, timeliness, statistical performance, popularity, etc.

Example uses are as follows:
1. A global catalog of all manufactured products, specifications, sources, terms of business, product text, prices, vendors, etc.
2. A global knowledgebase of all counter-terrorism sensors, surveillance, and warnings
3. A global knowledgebase containing all known life-forms and their attributes: cells, genes, organisms, animals, etc.
4. A global knowledgebase containing all known body functions, observation ranges, symptoms, attributes, therapies Referring to FIG. 1B, a diagram of a context-rich data cluster or repository 110 will be described. The context-rich data repository 110 contains broad contextual information and has multiple-dimensions. The data repository 110 has unlimited associations and no-predefined purpose. The data repository 110 can be considered as a virtual entity having multiple records describing and referring to a same object or phenomenon so as to generate a complete definition with various perspectives.

Figure 2:
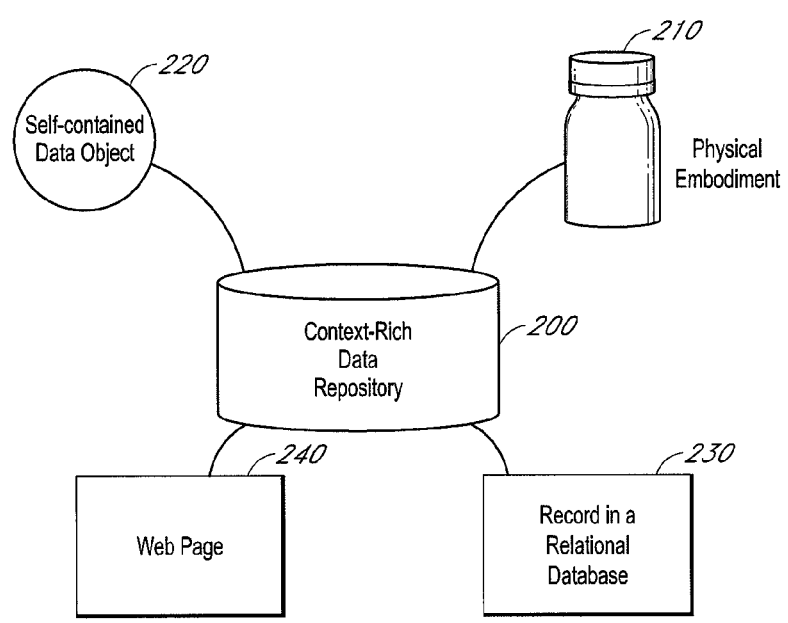
FIG. 2 is a block diagram illustrating the neutral nature of the context-rich data repository where interoperability and data sharing take precedence over form, and highlighting that information can morph into different forms depending upon the task at hand.

Referring to FIG. 2, the neutral nature of a context-rich data repository 200 is illustrated where interoperability and data sharing take precedence over form. Information can morph into different forms depending upon the task at hand. For example, data associated with a physical object, such as a medicine vial 210, can be embodied as a self-contained data object 220, a record in a relational database 230, or a web page 240.

Each record in the system data repository 200 can include the following features (Entries are either selected from a predefined list of valid terms or validated against a criteria):
1. A unique resource identifier code, such as a universally unique identifier (UUID) or digital object identifier (DOI)
2. One or more fields that represent other coding equivalents (e.g., Social Security number (SSN), international standard book number (ISBN))
3. One or more fields that represent the authority of the information source
4. Data origination specifications (device model, serial number, range, etc.)
5. One or more fields that represent permissions (users, user groups, operating systems, software, search spyders)
6. One or more fields that represent a language equivalents (translations)
7. One or more fields that represent the local measurement conversion of the data
8. One or more fields that represent the observable characteristics and equivalents/observations (visual images: a) front and b) rear, video, radar, IR, sound)
9. One or more fields that represent the physical parameters (length, height, width, diameter, weight, etc.)
10. One or more fields that represent the substance/composition makeup (ingredients, atomic elements, cell structure)
11. One or more fields that represent the relationship to other things (master, sub-assembly, component)
12. One or more fields that represent the economic context (suppliers, buyers, prices)
13. One or more fields that represent the social context (environmental, safety, disclosure)
14. One or more fields that represent the political context (laws, regulations)
15. One or more fields that represent the associated time, date, and location of the event or phenomenon Each field in the system data repository can include one or more attributes that:
1. represent the primary name
2. are synonymous with primary name
3. represent the privacy level
4. represent the user rights (actions) and level
5. represent the access/security level
6. represent the qualitative rating level
7. represent the hierarchical inheritance/tree position in a taxonomy or ontology
8. represent the version of the data
9. represent the valid date range of the data
10. contain a dynamic link to external data
11. represent a digital signature that authenticates the data
12. represent the permission level for search engine spyder access
13. represent the data entry person's identification
14. represent the data entry date, time and place In the data repository 200, fields, records and clusters may be delimited by symbols or advanced syntax like XML. The specification shows a flattened, expanded record but implementation is preferred in a relational or linked structure. Each data entry preferably includes attributes clarifying information relevant to interoperability, e.g., format, rate, measurement system, data type, etc.

Figure 3:
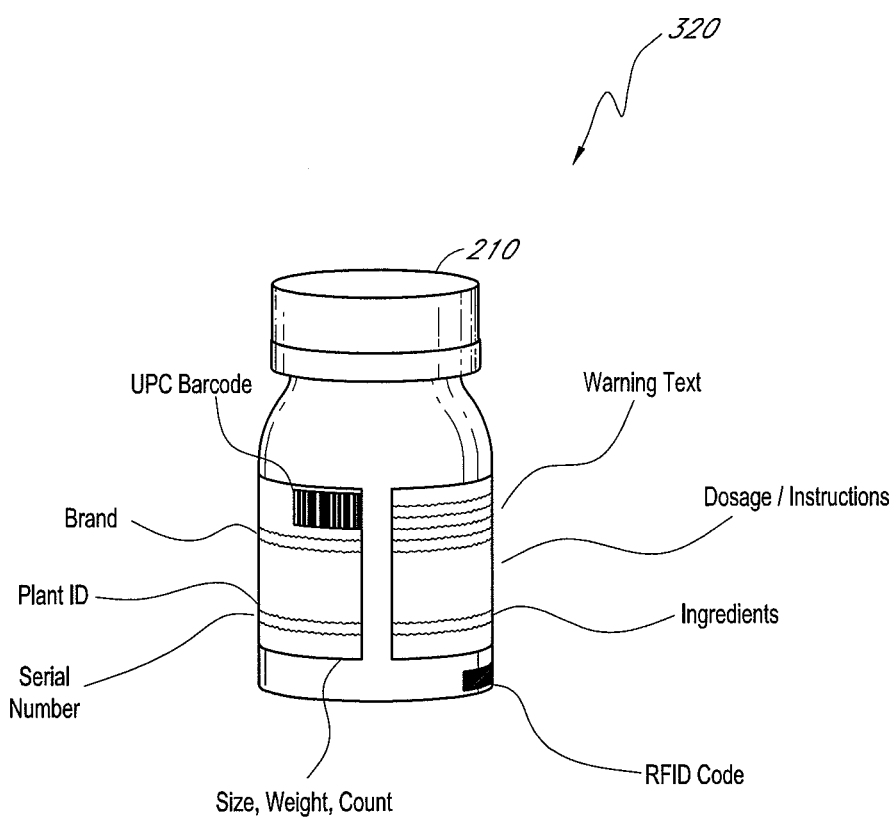
FIG. 3 is a diagram illustrating the contextual complexity of information on a typical medicine vial having references to chemicals, product codes, manufacturers, retailers, usage instructions, safety notices, laws, visual elements, etc.

Referring to FIG. 3, data elements 320 associated with the example medicine vial 210, shown in FIG. 2, will now be described. FIG. 3 illustrates the contextual complexity of information on a typical medicine vial. Information regarding a universal product code (UPC) barcode, brand name, plant identifier, serial number, size, weight, product count, radio frequency identification (RFID) code, ingredients, dosage, instructions, and warning text can all be associated with the medicine vial 210. As long as the vial is in existence, all its data elements are living links to multiple dynamic entities. Currently, there is no efficient means for validating or researching most of the information represented on the vial. This system would effectively provide a single resource capable of answering any consumer need related to the product, from ordering a refill to overdose intervention.

Figure 4:
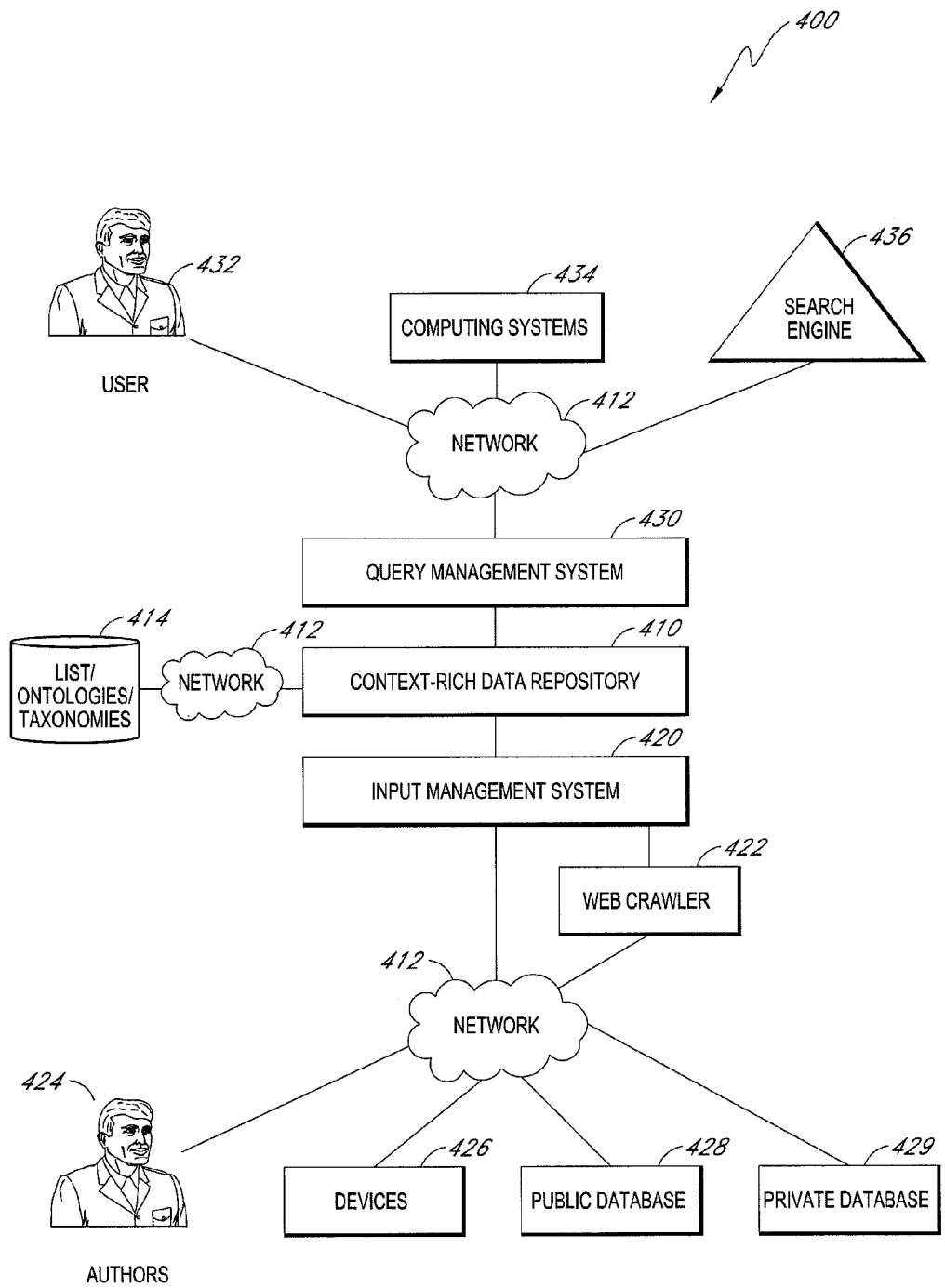
FIG. 4 is a block diagram of an embodiment of an example context-rich data repository system having an input management subsystem and a query management subsystem.

Referring to FIG. 4, an embodiment of an example context-rich data repository system 400 will be described. The system 400 includes a context-rich data repository 410 in communication with an input management subsystem 420 and a query management subsystem 430. The data repository 410 further connects via a network, such as a wide-area network, the Internet, or other types of networks, to lists, ontologies and/or taxonomies 414. The input management subsystem 420 further connects directly or by use of a web crawler 422 via the network 412 to authors 424, devices 426, public databases 428 and private databases 429. The query management subsystem 430 further connects directly or via the network 412 to a user 432, a computing system 434 and a search engine 436. Operation of the system 400 will be described herein below.

Figure 5:
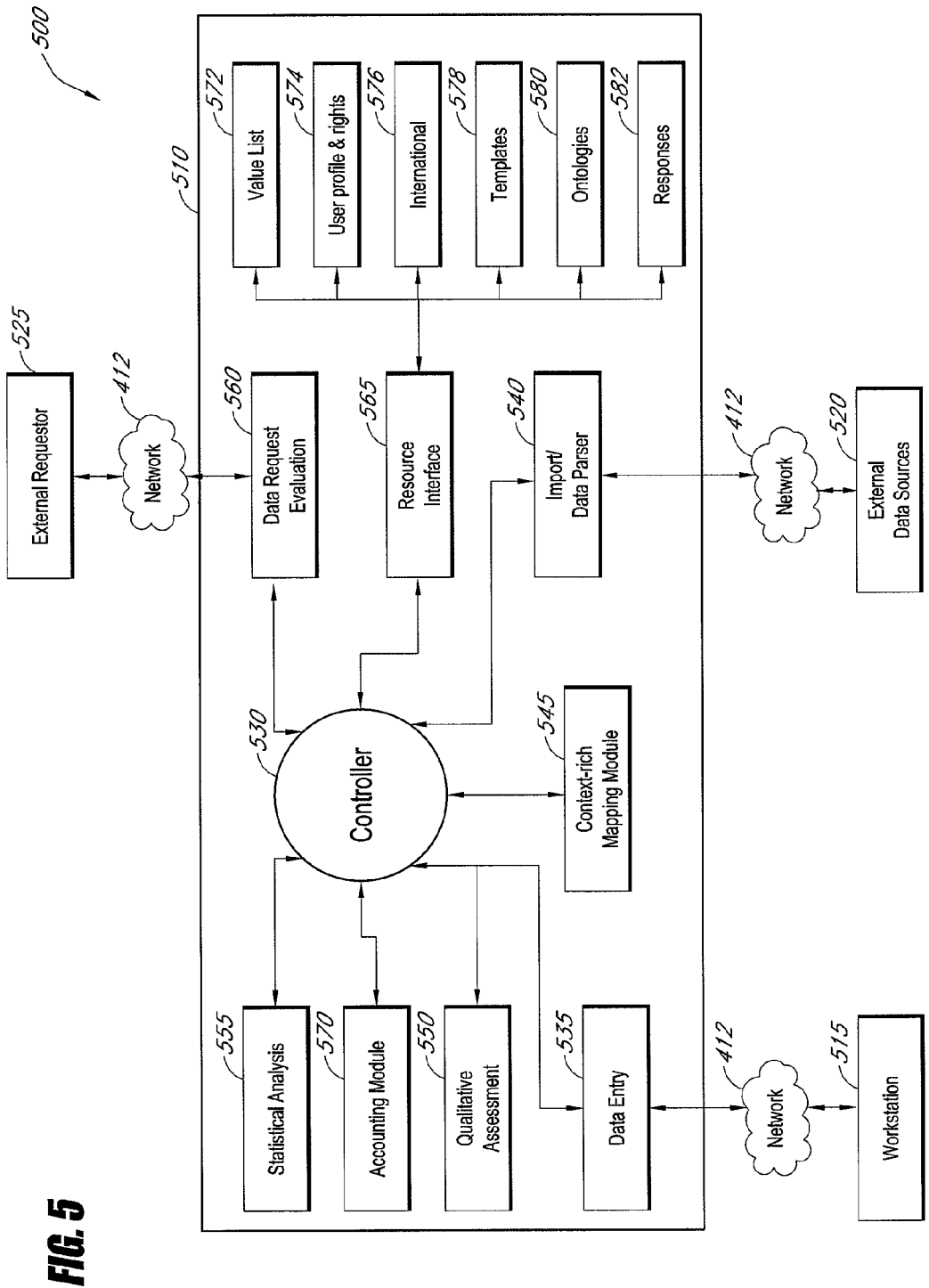
FIG. 5 is a block diagram of an embodiment of system software modules and data resources used by the system shown in FIG. 4.

Referring to FIG. 5, an embodiment 500 of system software modules and data resources used by the system 400 shown in FIG. 4 will be described. In certain embodiments, a server 510 can include the input management subsystem 420, the query management subsystem 430, and the context-rich data repository 410 shown in FIG. 4. A data entry module 535 associated with the server 510 is connected via the network 412 to a workstation 515. External data sources 520 connect via the network 412 to an import/data parser module 540 associated with the server 510. External requesters 525 connect via the network 412 to a data request evaluation module 560 associated with the server 510. A controller or processor 530 in the server 510 operates on the data entry module 535, the import/data parser module 540, the data request evaluation module 560, and also a context-rich mapping module 545, a qualitative assessment module 550, a statistical analysis module 555, a resource interface module 565, and an accounting module 570. The resource interface module 565 is in communication with and provides value lists 572, user profiles and rights 574, international information (e.g., language and measure equivalents) 576, templates 578, ontologies 580 and responses 582. The functions and processing performed by these modules will be described herein below.

Figure 6:
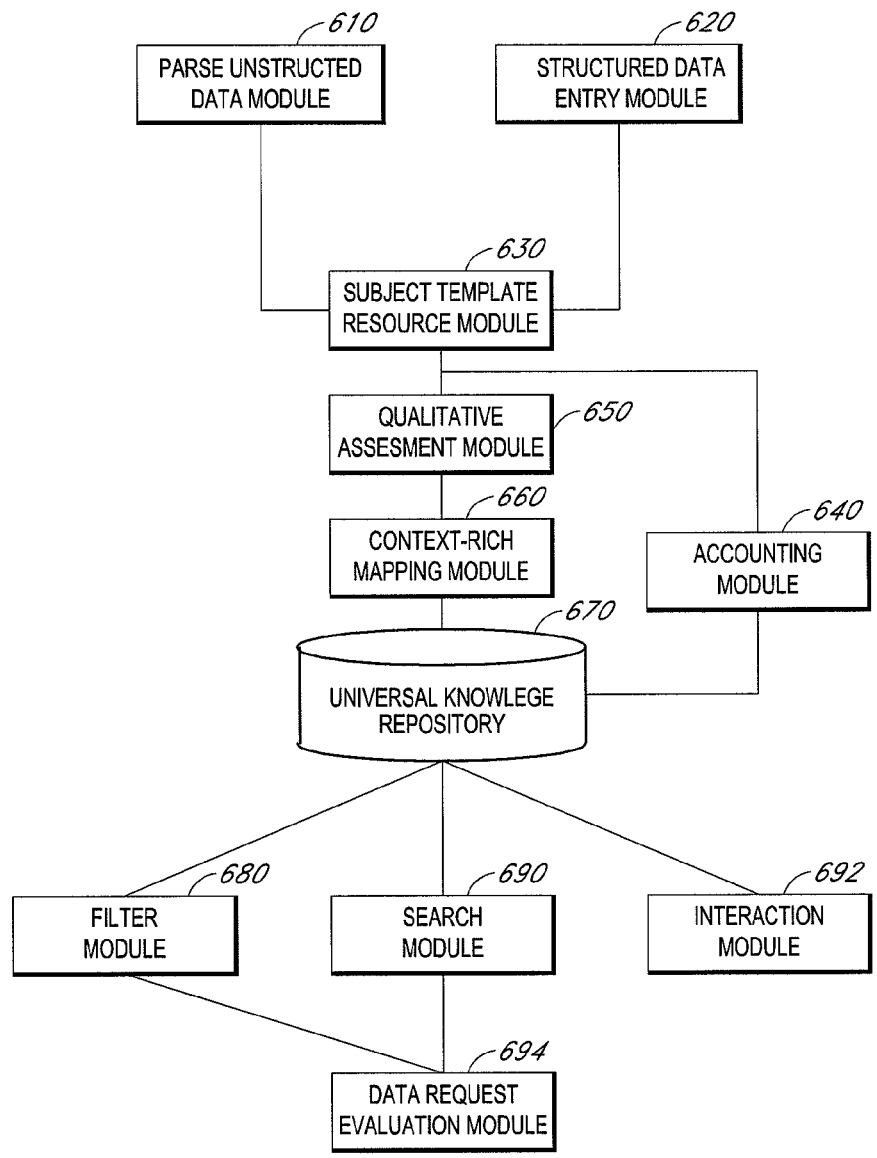
FIG. 6 is an overview illustrating one embodiment of a system for data management.

FIG. 6 is an overview illustrating one embodiment of a system for data management. Depending on the embodiment, certain modules may be removed or merged together.

The system may comprise a parse unstructured data module 610 configured to map unstructured data into data organized in a context-rich data structure. The system may comprise a structured data entry module 620 configured to receive data input from a source which is compatible with a context-rich data structure. The source could be, for example, a user.

The system may comprise a subject template resource module 630 configured to receive data organized from the parse unstructured data module 610 and the structured data entry module 620. The subject template resource module 630 is configured to look up each element of the object in one or more topic structures such as ontologies, taxonomies, or lists related to the selected template. The upper and lower tree elements for each word are retrieved and stored as a reference to the word along with an identification of what resource is used for the match. A contextualization process is run to calculate results for the newly acquired subject terms. Each calculated context value resulting from the foregoing processes is then compared to each field of the template in order to determine the probability of a match with previously analyzed objects of the same meaning.

The system may comprise a qualitative assessment module 650 configured to receive input from the subject template resource module 630 and then look up the recorded attributes in a table for each category in order to calculate a qualitative score for such things as sources, authors or other deterministic variables.

The system may comprise a context-rich mapping module 660 configured to receive input from the qualitative assessment module 650 and then add further information into the structured data.

The system may comprise a universal knowledge repository 670 configured to store data in the form of context-rich data clusters that have a logical structure that facilitates efficient access by any one of many data retrieval engines such as: data mining tools, relational databases, multi-dimensional databases, etc. The universal knowledge repository 670 may be configured to receive structured data from the context-rich mapping module 660. The data stored in the universal knowledge repository 670 may be accessed by other modules. The universal knowledge repository 670 may be any suitable software or hardware for data storage. In one embodiment, the universal knowledge repository 670 is a database.

The system may comprise a search module 690 configured to access the universal knowledge repository 670 for a search directly or via a network. The search module 690 may be any tools or programs suitable for returning a set of search results by searching a database based on a user query request, including search engines provided by Google Inc., Microsoft or Verity.

The system may comprise a filter module 680 in connection with the universal knowledge repository 670 and the search module 690, all connected directly or via a network. The filter module 680 is configured to interpret user preferences from a user message that indicates how to manage ambiguous data sets, and then provide the query syntax containing relevant variables for the search module 690.

The system may comprise an interaction module 692 in communication with the universal knowledge repository 670 and the search module 690, all connected directly or via a network. The interaction module 692 is configured to interact with a user to narrow a search result returned by the search module 690.

The system may comprise a data request evaluation module 694 configured to receive a user query and return a final search result to the user. The data request evaluation module 694 is configured to manage requests for access to and delivery of data stored in the universal knowledge repository 670 by communicating to the filter module 680 and/or the search module 690.

The system may comprise an accounting module 640 configured to communicate with other modules in the system to track user activities such as data submission and for administrative purposes such as billing, credit, or reporting. The accounting module may be useful for, for example, applications where searching or data entry is a service for fee or where detailed user auditing is required.

The system may be implemented in any suitable software or hardware. In an exemplary embodiment, the system may be implemented in one or more software applications. Each module may run on any suitable general purpose single- or multi-chip microprocessor, or any suitable special purpose microprocessor such as a digital signal processor, microcontroller, or a programmable gate array. The system may further comprise a memory for data storage. The processor may visit the memory, for example, in the process of performing any of the modules discussed here.

Figure 7:
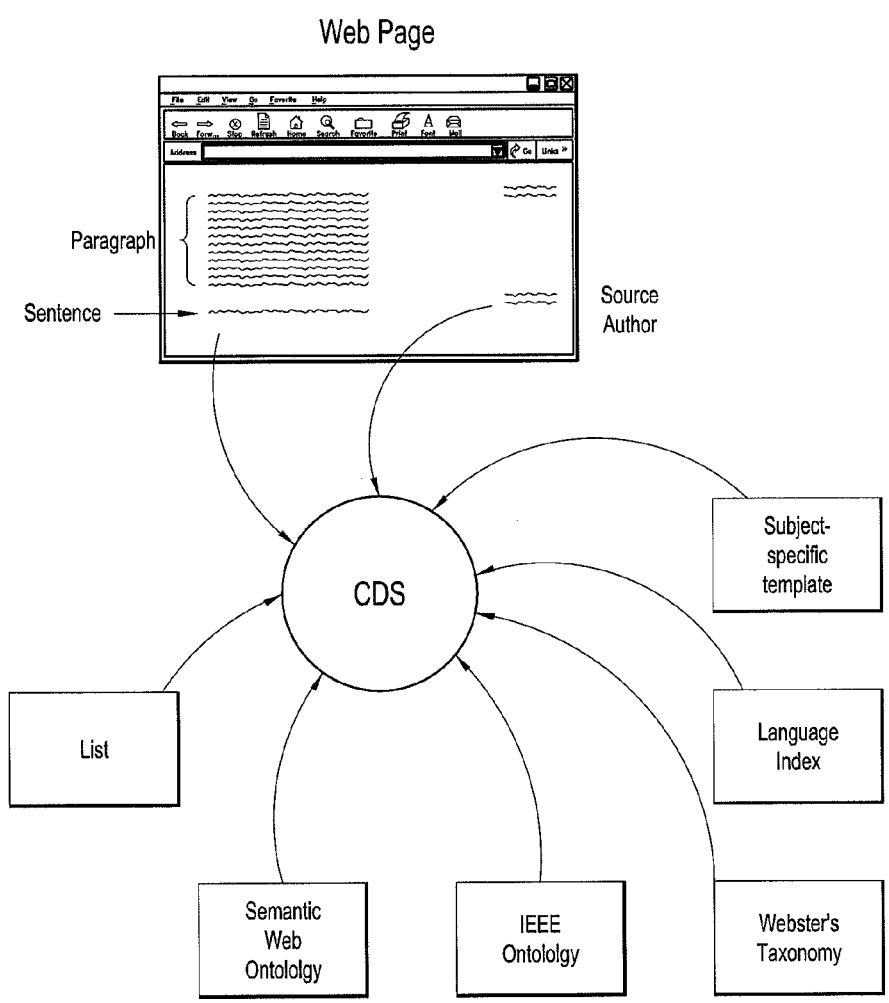
FIG. 7 is an example illustrating the process of mapping unstructured data into a context-rich data structure.

FIG. 7 is an example illustrating the process of mapping unstructured data into a context-rich data structure. In the example, the unstructured data comes from a webpage including paragraphs, sentences, and source author. Many other instances or sources of the same phenomenon may be later incorporated in the parallel structure. The unstructured data is converted into a context-rich data structure by applying a series of processes with the help of at least one or more of the following: subject-specific template, language index, Webster's taxonomy, IEEE ontology, semantic web ontology, and a set of lists.

FIG. 8 is an example of the subject-specific template. The template is divided into a set of field groups including, but not limited to, identification, subject, physical, observable, economic, and social. Each field includes a list of associated items describing the source or usage context of the field.

FIG. 9 is an example illustrating the process of calculating a qualitative score for each entity based on all records associated with that entity. An entity can be anything that may influence the data, such as: source organization, source person, source device, etc. The table records the score of each past transaction indicating, for example, the completeness, integrity, and the popularity. Each transaction may have a unique record identification number and associated with one entity identification. The bottom of the scorecard summarizes the total score associated with a particular entity based on the score of all transactions associated with that entity.

FIG. 10 is an example illustrating the process of calculating a qualitative score for each record based on all parameters included in that record. In the example, each record includes parameters A, B, C, . . . , G. A score is given in the table for each parameter. By simply adding the score for each parameter within a record, the score of the record is determined. It will be appreciated that other mathematical approaches may be taken to determine the score of a record based on scores for parameters of that record.

Figure 11:
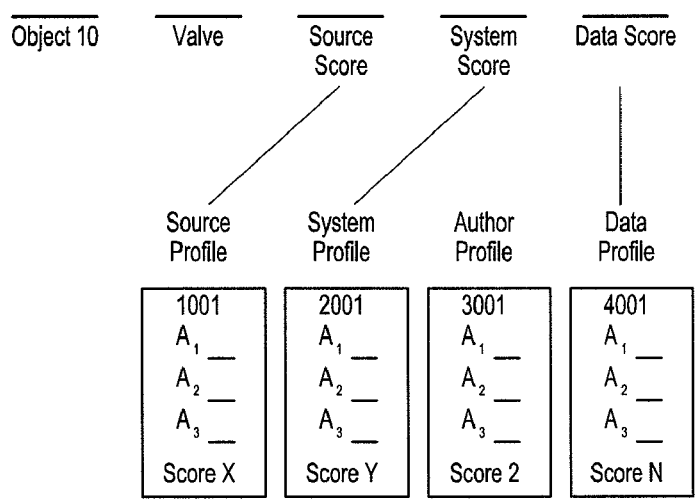
FIG. 11 is an example illustrating the process of scoring each entry within a record.

FIG. 11 is an example illustrating the process of scoring each entry within a record. Each record includes a set of entries such as SOURCE, SYSTEM, DATA, or AUTHOR. The qualitative attributes such as A1-A3 associated with each entry is read and a score is calculated for each entry.

FIG. 12 is an example illustrating a table which may be used in the process of mapping unstructured data into a context-rich data structure. Such a process will be described in further detail with regard to FIG. 19. The mapping table includes entries including Primary Source, Secondary Sources, Parallel Syntax, and Template Reference. Each entry may include multiple elements each of which has a corresponding confidence score (e.g., the qualitative score).

FIG. 13 is an example of a user query message. The query message includes, for example, requestor identification code used to link the user to his personal profile and accounting log, template identification code, response identification code, query expression, source quality range or other quality preference variables, and render level preference.

Figure 14:
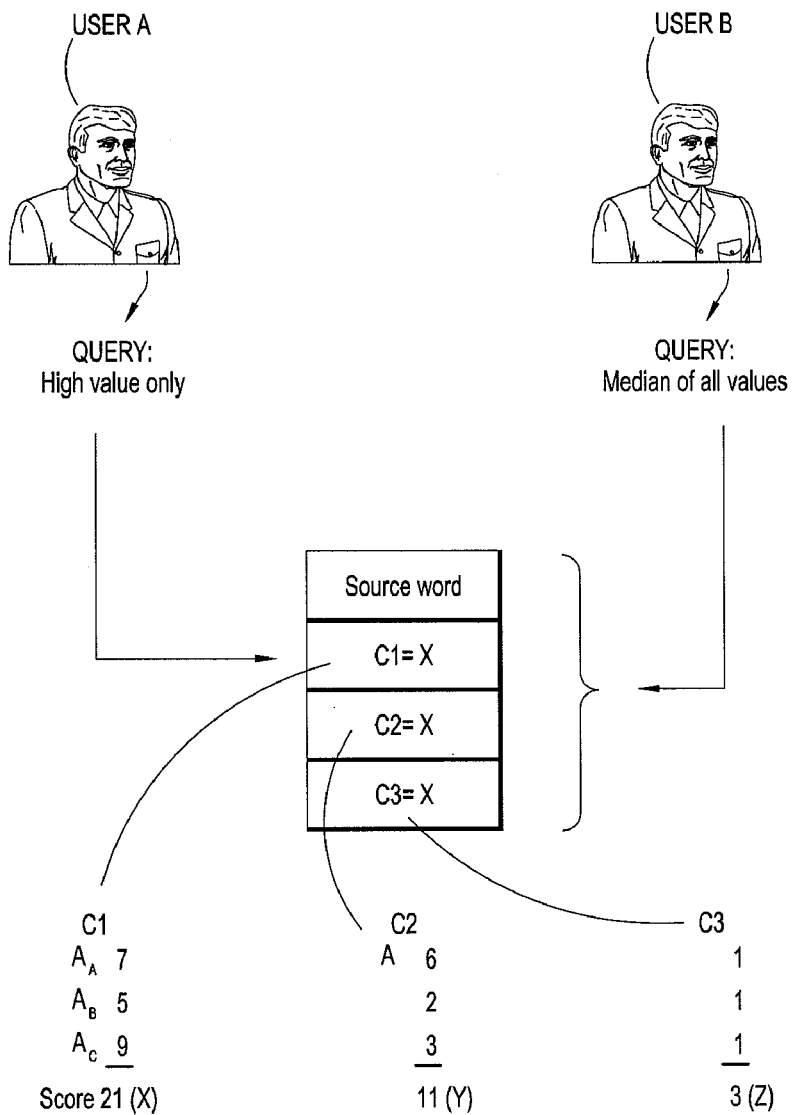
FIG. 14 is an example illustrating the process of retrieving data based upon user-designated quality parameters.

FIG. 14 is an example illustrating the process of retrieving data based upon user-designated quality parameters. In the example, user A restricts searches in his query to only the highest level of classification authority whose credentials are the highest scoring. However, user B is more interested in a broader scope and specifies in his query that a median value for all sources is preferred.

Figure 15:
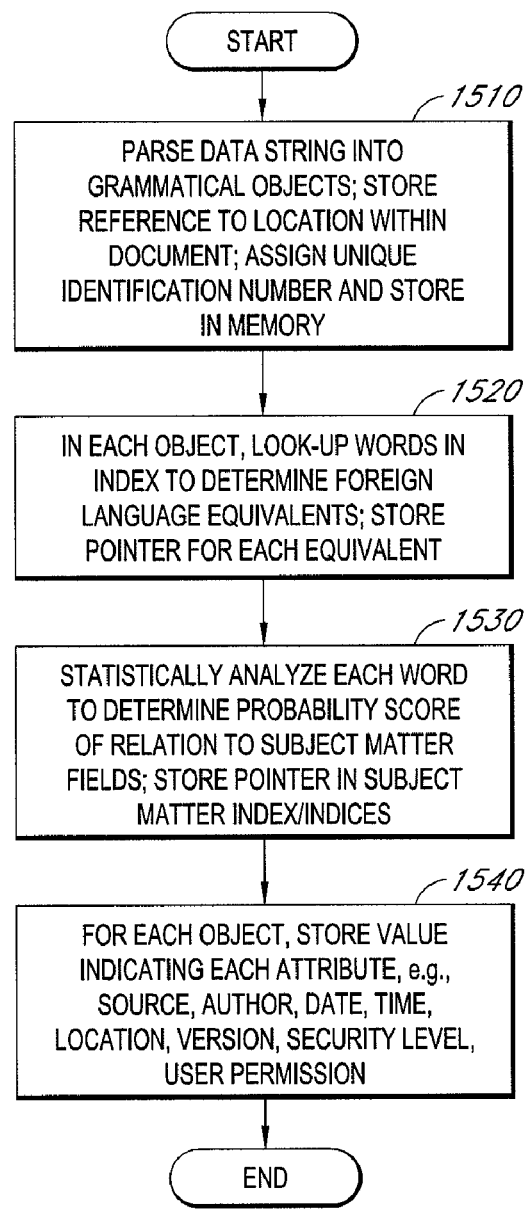
FIG. 15 is a flowchart of one embodiment of a method of formatting unstructured data.

FIG. 15 is a flowchart of one embodiment of a method of formatting unstructured data. The exemplary method may be performed, for example, by the parse unstructured data module as described in FIG. 6. Depending on the embodiment, certain steps of the method may be removed, merged together, or rearranged in order.

In the exemplary method, a data stream is received and then parsed into one or more grammatical elements (e.g. word, sentence, paragraph, etc.), assigned a unique identification code and attributes as to what other elements it is a member of (e.g. a word is a member of a sentence, a paragraph and a page). Depending upon the origin of the data, other key field may be extracted such as: source, date, author, descriptive markup language (e.g. XML, HTML, SGML), etc. Each element is stored in a suitable memory structure together with associated links.

The method starts at a block 1510, where an input data string or stream is parsed into one or more grammatical objects (e.g. word, sentence, paragraph, etc.). The input data string may be received, for example, from an external web crawler, a data stream such as RSS, or a conventional file transfer protocol. A reference to the location of each grammatical object within the data string is stored. A unique identification number is assigned to each object and stored in memory.

Next at a block 1520, words within each grammatical object are looked up in the index to determine equivalents to one or more words. The equivalent may include, for example, synonym in the same language or a word or word group in a foreign language having equivalent meaning. In one example, English is used as the system reference language and the data being parsed is French. Each word is looked up in all foreign language indexes to determine the best translation and then a pointer to each language equivalent word is stored. In one embodiment, numbers, measures, and all other non-Grammatik objects are converted using the respective cultural indexes.

Moving to a block 1530, each word is statistically analyzed to determine a probability score indicating how close the word is related to each subject matter field. A series of statistical routines are applied to each element parsed in the previous processes in order to calculate results that uniquely reflect the word positions and relative associations within the object. This result is then compared to an archive of subject matter specific templates that contain similar context-values of other known objects that belong to the subject field represented by the template. If the match results in a probability result over a certain threshold, a link is established in both the record of the object and in the template. The pointer to each word is then stored in at least one subject matter index.

Next at a block 1540, a value is stored for each attribute within each object. The attributes of each object may include, e.g., source, author, date, time, location, version, security level, and user permissions. In one embodiment, not all attributes within an object have a value stored. One or more attributes may be left unassigned.

Figure 16:
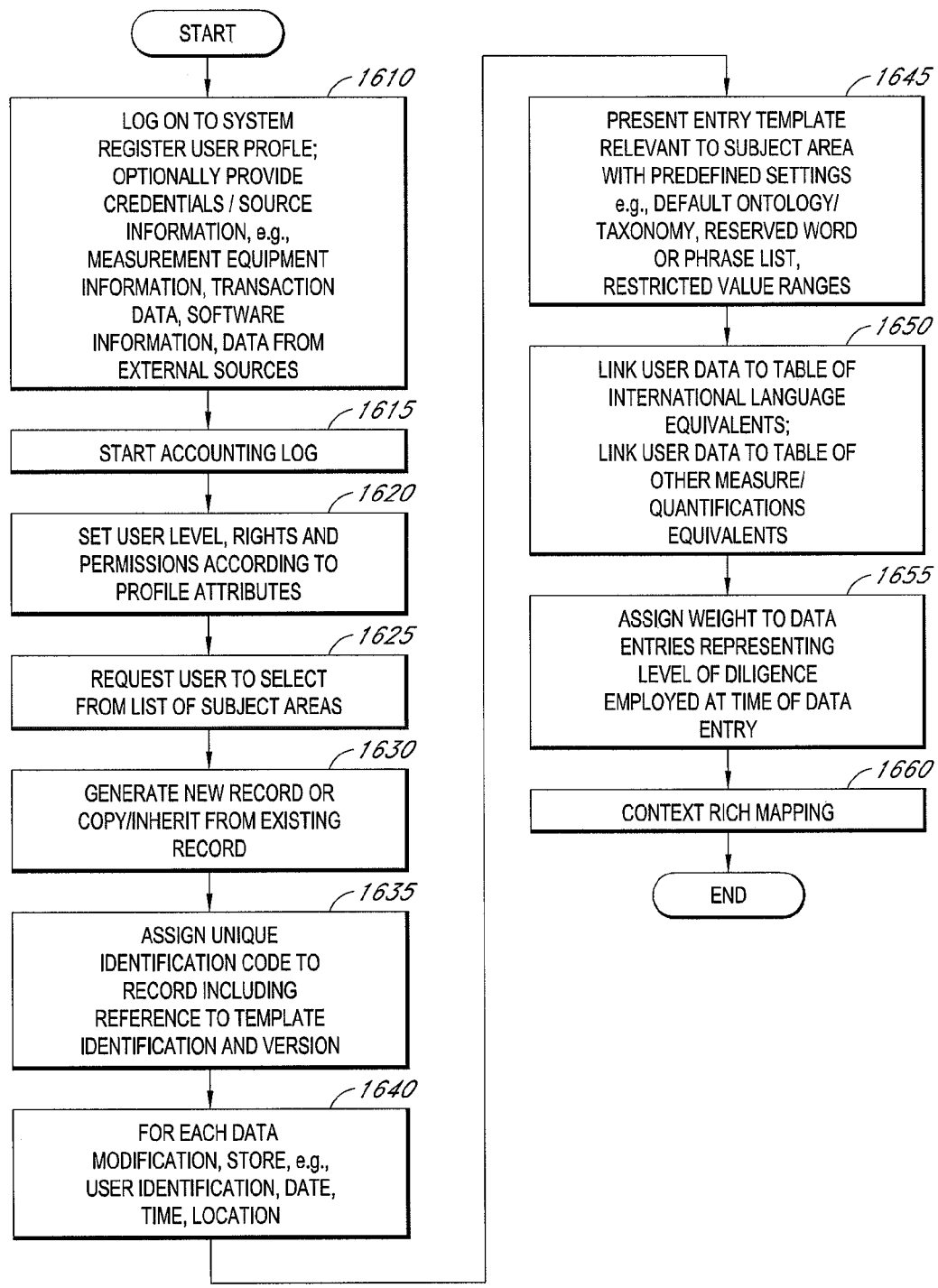
FIG. 16 is a flowchart of an embodiment of the structured data entry module shown in FIG. 6.

Referring to FIG. 16, a flowchart of an embodiment of a process performed by the structured data entry module 620 shown in FIG. 6 will be described. FIGS. 6, 8, 9, 10, 11 and 12 are also referred to in the discussion of the structured data entry module 620.

Process 620 begins at a start state and moves to state 1610 where a user logs on to the system (e.g., server 510, FIG. 5), registers a user profile and provides credentials if applicable. The qualitative process described below depends in part upon the quality of the credentials presented or recorded into the profile with regard to the source entity, data generation device or software, author, etc., and can include:

a. Measurement equipment brand, model, serial, specifications
    b. Transaction data
    c. Software package, version, routine
    d. Information retrieved from an external source file/system, e.g., prices, inventory levels, sensor values.

Proceeding to state 1615, process 620 starts an accounting log. In some applications, data entry is a service for fee or where detailed user auditing is required. The Accounting module 640 (FIG. 6) is responsible for tracking user activity and data submissions for later billing, credit or reporting. Continuing at state 1620, based upon the profile and credentials presented above, an access control subsystem sets user level, rights and permissions that regulate what type of data may be entered or edited, what can be seen and what related activities are provided. Advancing to state 1625, process 620 looks up the user identification (ID) in the index to determine what actions are allowed. Based upon the profile, the system presents the user with a list of subject areas he or she is permitted to enter.

Proceeding to state 1630, process 620 generates a new record or copies/inherits from an existing record and, at state 1635, assigns a unique identification code to the record. Continuing at state 1640, process 620 stores, in certain embodiments, the user ID, date, time and location for each data modification.

Advancing to state 1645, process 620 calls upon the Subject Template and Resource module 630 (FIG. 6) to present the user with a data entry form derived from the subject specific template (e.g., FIG. 8) selected above. Each field of the form may potentially discipline the user input to valid data ranges or other performance standards. The process continues by looking up each element of data entry in one or more topic structures such as ontologies, taxonomies or lists related to the selected template. The upper and lower tree elements for each word are retrieved and stored as a reference to the word along with an identification of what resource was used for the match. A Contextualization process then calculates results for the newly acquired subject terms. Each calculated context-value resulting from the foregoing processes is then compared to each field of the template in order to determine the probability of a match with previously analyzed objects of the same meaning. Templates are designed to capture a context-rich data structure and include such resources as:

source identity, location, file format and size
    Higher, lower and equivalent subject classifications together with a reference to source
    Observable records (e.g., photos, videos, radar signature, IR, temperature, etc.)
    Physical measures (e.g., height, weight, depth, latitude, atomic mass, chemical structure, etc.)
    Economic variables (e.g., price, stock, manufacturer names, retailer names).

At the completion of state 1645, process 620 moves to state 1650 where an Internationalization process loads each word entered in the form, looks it up in all foreign language indexes to determine the best translation and then stores a pointer to each language equivalent word. Numbers, measures, and all other non-grammatic objects are converted using the respective cultural indexes.

Proceeding to state 1655, processing moves to the Qualitative Assessment module 650 (FIG. 6) where the recorded attributes are looked up in a table for each category in order to calculate a qualitative score. See also FIGS. 9-11. In an example, the source of the information in the object comes from a French government agency with a high score indicating that the source has been authenticated, the data is valid and previous experience has been of high quality. The score is returned for association with the element and the source table is updated.

Proceeding to state 1660, processing continues at the Context-rich Mapping module 660 (FIG. 6) that loads each word for every field in the current form being processed into the primary source record of a mapping table along with the associated qualitative scores. See also FIG. 12. This repeats for each subsequent word and/or element contained in the form. The module then proceeds to load contents into secondary source records if they exist at this time. Otherwise the module loads contents into parallel syntax records corresponding to each source field and organized by the relevant hierarchical location in the subject tree. For example, the first primary source word would be looked up in the first topic tree, retrieve the next highest term (along with the tree ID and quality attribute) and place it in the first parallel syntax record in a position associated with the first primary source word. Lastly, the module loads the calculated results from template analysis in the corresponding fields for each primary source element. At the completion of state 1660, process 620 ends at an end state.

Figure 17:
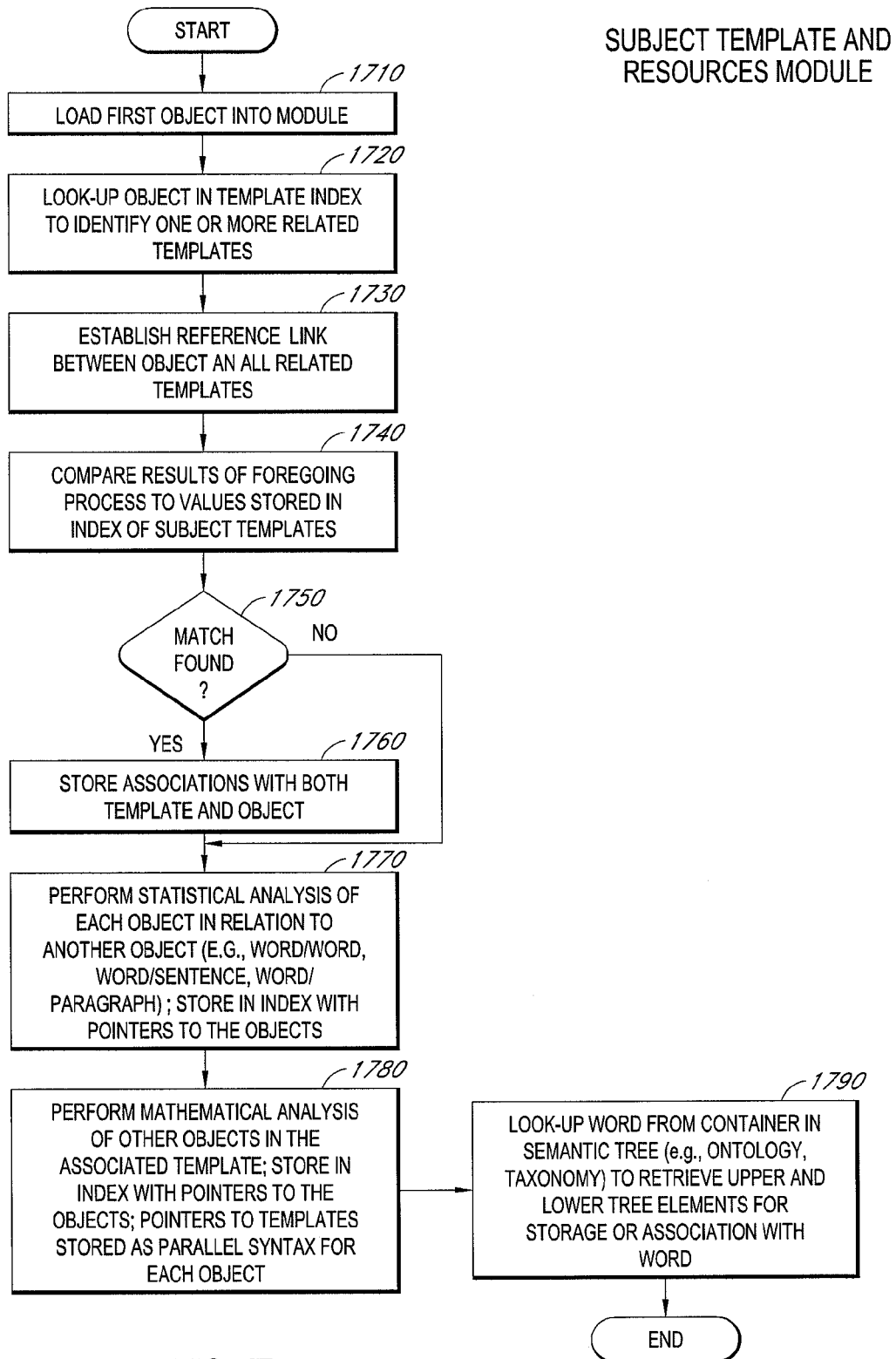
FIG. 17 is a flowchart of one embodiment of a method of linking a data object to one or more templates.

FIG. 17 is a flowchart of one embodiment of a method of linking a data object to one or more templates. The exemplary method may be performed, for example, by the subject template and resources module as described in FIG. 6. Depending on the embodiment, certain steps of the method may be removed, merged together, or rearranged in order.

The method looks up each element of the parsed object in one or more topic structures such as ontologies, taxonomies or lists related to the selected template. An example of the template is illustrated in FIG. 8. The upper and lower tree elements for each word are retrieved and stored as a reference to the word along with an identification of what resource was used for the match. A contextualization process is run to calculate results for the newly acquired subject terms. Each calculated context-value resulting from the foregoing processes is then compared to each field of the template in order to determine the probability of a match with previously analyzed objects of the same meaning. In one embodiment, templates are designed to capture a context-rich data structure to include such resources as: a) source identity, location, file format and size; b) higher, lower and equivalent subject classifications together with a reference to source; c) observable records (e.g. photos, videos, radar signature, IR, temperature, etc.); d) physical measures (e.g. height, weight, depth, latitude, atomic mass, chemical structure etc.); and e) economic variables (e.g. price, stock, manufacturer names, retailer names).

The method starts at a block 1710, where a first object is loaded. Next at a block 1720, each object is looked up in template index to identify one or more related templates. Moving to a block 1730, a reference link is established between an object and each related template. Next at a block 1740, the results from block 1730 are compared to values stored in the index of subject templates.

If a match is found at a block 1750, the method moves to a block 1760. At the block 1760, the associates are stored with both the template and the object before the method moves next to block 1770. If no match is found at block 1750, the method jumps to block 1770.

Next at block 1770, statistical analysis of each object in relation to another object is performed. The analysis result is then stored in the index with pointers to the objects. As described earlier, each object could be, e.g., a word, a sentence, a paragraph, an article, and so on.

Moving to a block 1780, mathematical analysis is performed of other objects in the associated template. Again, the analysis result is stored in the index with pointers to the objects. In one embodiment, pointers to templates are stored as parallel syntax for each object.

Next at a block 1790, a word is looked up from the container in a semantic tree to retrieve upper and lower tree elements for storage or association with the word. The semantic tree could be, for example, several different ontologies or taxonomies.

Figure 18:
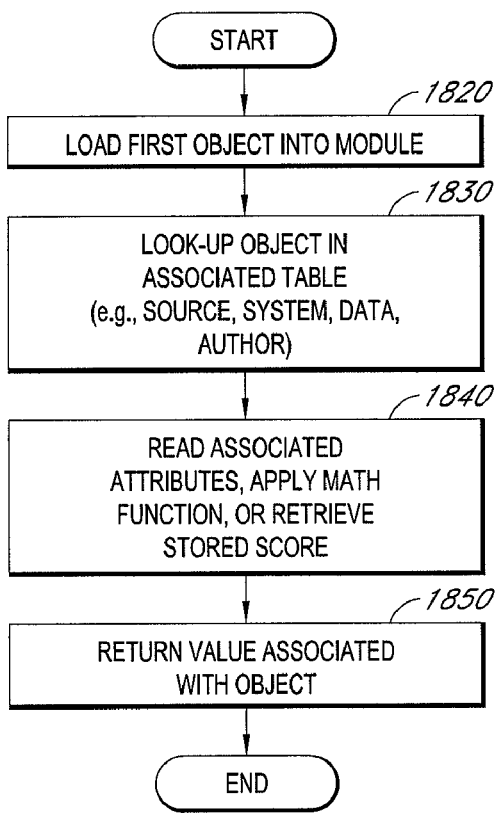
FIG. 18 is a flowchart of one embodiment of a method of evaluating the quality of a data object.

FIG. 18 is a flowchart of one embodiment of a method of evaluating the quality of a data object. The exemplary method may be performed, for example, by the qualitative assessment module as described in FIG. 6. Depending on the embodiment, certain steps of the method may be removed, merged together, or rearranged in order. The method of evaluating the quality of a data object is further illustrated earlier in FIGS. 9-11.

In the method, the attributes recorded in the object are looked up in a table for each category in order to calculate a qualitative score. In one example, the source of the information in the object comes from a French government agency with a high score indicating that the source has been authenticated, the data is valid, and has been of high quality in past experience. The score is returned for association with the element and the source table is updated.

The method starts a block 1820, where an object is loaded. Moving to a block 1830, the object is looked up in associated table. The table could be, for example, SOURCE, SYSTEM, DATA, or AUTHOR. Next at a block 1840, attributes associated with the object is read. In one embodiment, a mathematical function is applied to generate a score. In another embodiment, a stored score is retrieved.

Last at a block 1850, the score/value associated with the object is returned. In one embodiment, the score/value indicates the quality of the data object.

Figure 19:
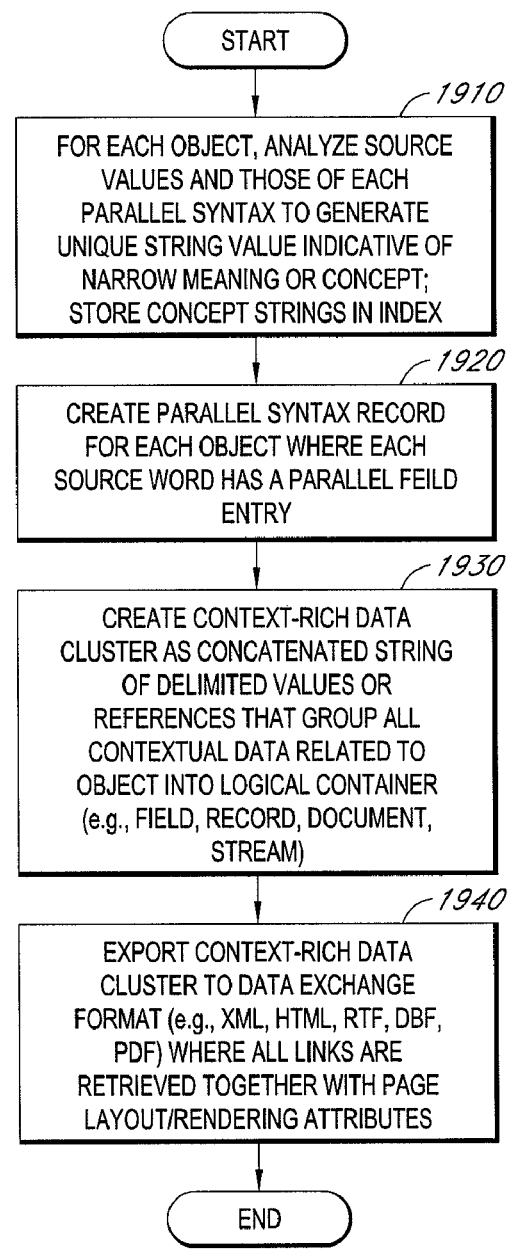
FIG. 19 is a flowchart of one embodiment of a method of adding contextual data to a data object.

FIG. 19 is a flowchart of one embodiment of a method of adding contextual data to a data object. The exemplary method may be performed, for example, by the context-rich mapping module as described in FIG. 6. Depending on the embodiment, certain steps of the method may be removed, merged together, or rearranged in order.

In this method, the first word of the first element of the current object is first loaded into the Primary Source record of a mapping table, such as the mapping table illustrated in FIG. 12, along with the associated qualitative scores. The same process is repeated for each subsequent word and/or element contained in the object. The foregoing fields are also loaded into Secondary Source records if such data exists at this time. Otherwise these fields are loaded into Parallel Syntax records corresponding to each Source field and organized by the relevant hierarchical location in the subject tree. Lastly, the calculated results from Template analysis are loaded in the corresponding fields for each Primary Source element.

The method starts at a block 1910, where, for each object, source values of the object and of parallel syntaxes are analyzed to generate unique string values, which are indicative of a narrow meaning or concept. Each parallel syntax expresses a different level of abstraction from the primary source. In one example, it may be possible to have several source documents that appear to present conflicting information but following the process described here, the second highest parallel syntax might reveal that all the documents merely express the same idea in different terms. The concept strings are then stored in the index.

Moving to a block 1920, a parallel syntax record is created for each object where each source word has parallel field entry.

Moving to a block 1930, context-rich data clusters are created as concatenated strings of delimited values or references that group contextual data related to the object into logical structures. The logical structures may be, for example, a field, a record, a document, URLs, a file or a stream.

Next at a block 1940, the context-rich data cluster may optionally be exported to a data exchange format (e.g., XML, HTML, RTF, DBF, PDF). In the data exchange format, reference links are retrieved together with page layout/rendering attributes.

Figure 20:
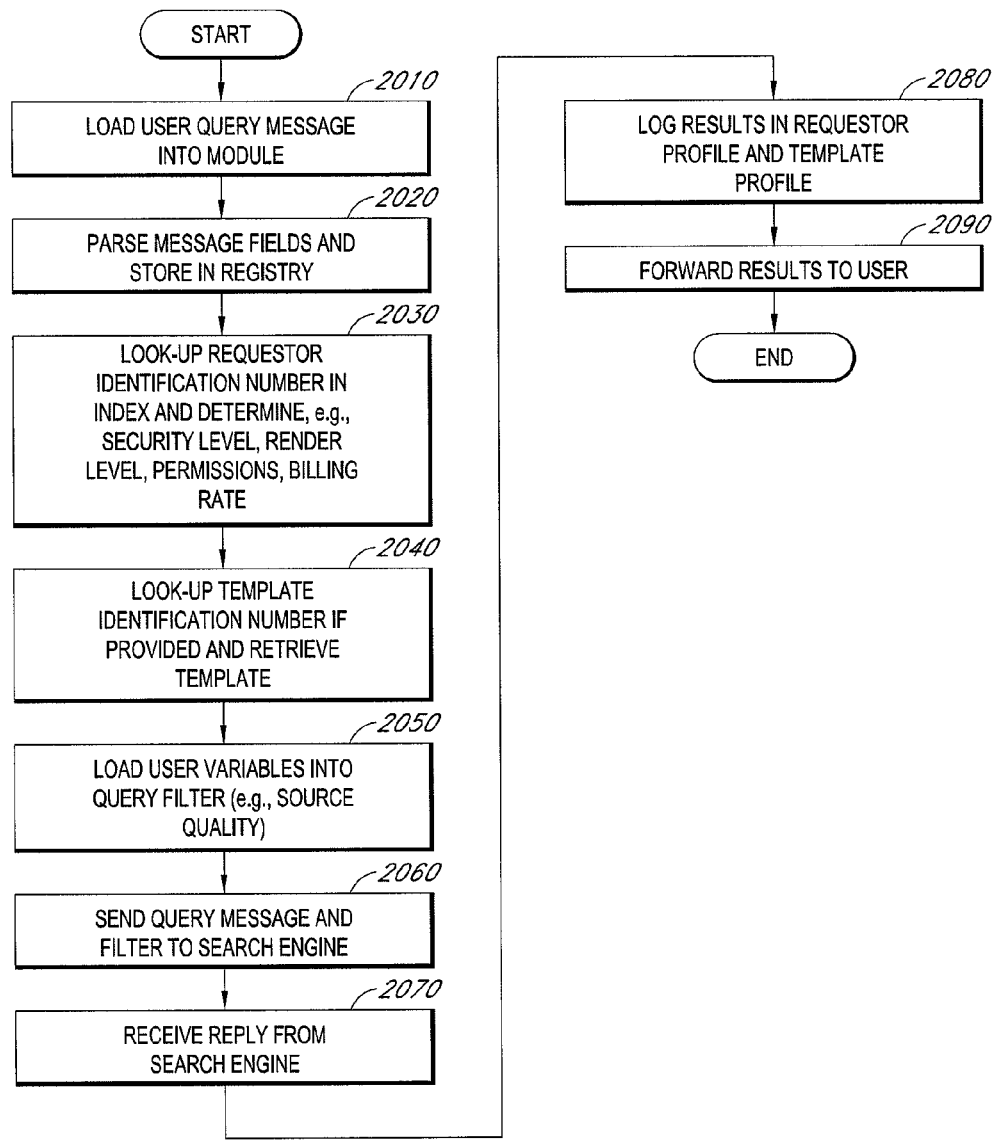
FIG. 20 is a flowchart of one embodiment of a method of searching a database based on a user quest.

FIG. 20 is a flowchart of one embodiment of a method of searching a database based on a user quest. The exemplary method may be performed, for example, by the data request evaluation module as described in FIG. 6. Depending on the embodiment, certain steps of the method may be removed, merged together, or rearranged in order.

The method starts at a block 2010, where a user query message is received and loaded. The user query message may be in various formats. In the exemplary embodiment, the message is in the format of the request message illustrated in FIG. 13.

Moving to a block 2020, message fields are parsed according to the message format and stored in a registry.

Next at a block 2030, each parsed field is loaded and a lookup is performed in the profile database. In the profile database, a requestor identification number is linked to an authorized person or entity. Based on the requestor identification number provided in the user query message, parameters related to a particular use may be determined, such as security level, render level preference, permissions, and billing rate. The render level preference indicates the depth or robustness of information desired for the application. Depending upon the user permissions and render level preference, a query reply may contain several words or several terabytes.

In another embodiment, the parsed message may further comprise one or more of the following: a template identification code, a response identification, a query expression, a set of source quality parameters. The template identification code indicates if the search query is to be directed to a specific element of a subject-matter specific template. The response identification refers to specific information needed to send a reply to the requesting party. The query expression may be any one of many query syntaxes in use such as SQL. The set of source quality parameters indicates how the raw data will be filtered prior to conducting the query so as to conform with the requesting party's qualitative restrictions. The qualitative restrictions may pertain to, for example, source, author, data, system, etc.

One example is illustrated earlier in FIG. 14. In that example, one user might restrict searches to only the highest level of classification authority whose credentials are the highest scoring while another user might be more interested in a broader scope and request that a median value for all sources is preferred.

Moving to a block 2040, the template identification code is looked up if it is provided in the user query message. A template corresponding to the template identification code is then retrieved.

Next at a block 2050, certain user variables (e.g., source quality) are loaded into the query filter.

Moving to a block 2060, the user query message and filter variables are sent to a search module such as the search module 690 as described earlier in FIG. 6. The search module may be any tools or programs suitable for returning a set of search results by searching a database based on a user query request, including the search engine provided by Google Inc.

Next at a block 2070, search results are received from the search module. In one embodiment, a determination is made as to whether the received search results reflect two or more plausible search paths matching different subject templates.

Moving to a block 2080, the user query and its results are logged into the requestor's profile and the template profile for tracking.

Next at a block 2090, the results are forwarded to the user in accordance with the user's preferences. In some cases, additional user input is required in order to further refine the search result to a single subject area.

Figure 21:
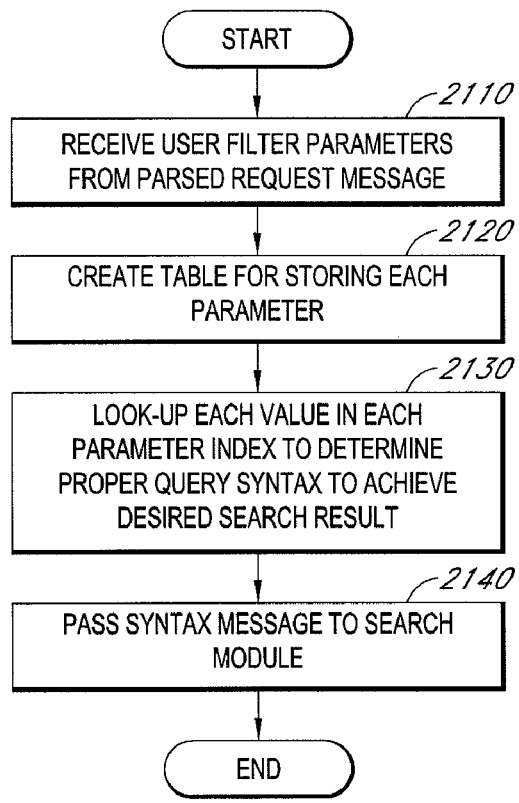
FIG. 21 is a flowchart of one embodiment of a method of generating query syntax based on a user query message.

FIG. 21 is a flowchart of one embodiment of a method of generating query syntax based on a user query message. The exemplary method may be performed, for example, by the filter module as described in FIG. 6. Depending on the embodiment, certain steps of the method may be removed, merged together, or rearranged in order. In one embodiment, the query syntax is then sent to a search module as input for a search operation.

The method starts at a block 2110, where one or more user filter parameters are received from a parsed user query message. Next at a block 2120, a table may be created for storing each filter parameter. Moving to a block 2130, each filter parameter value is looked up in the parameter index to determine proper query syntax in order to achieve the desired search result. Next at a block 2140, the syntax message is passed to the search module as described in FIG. 6.

Figure 22:
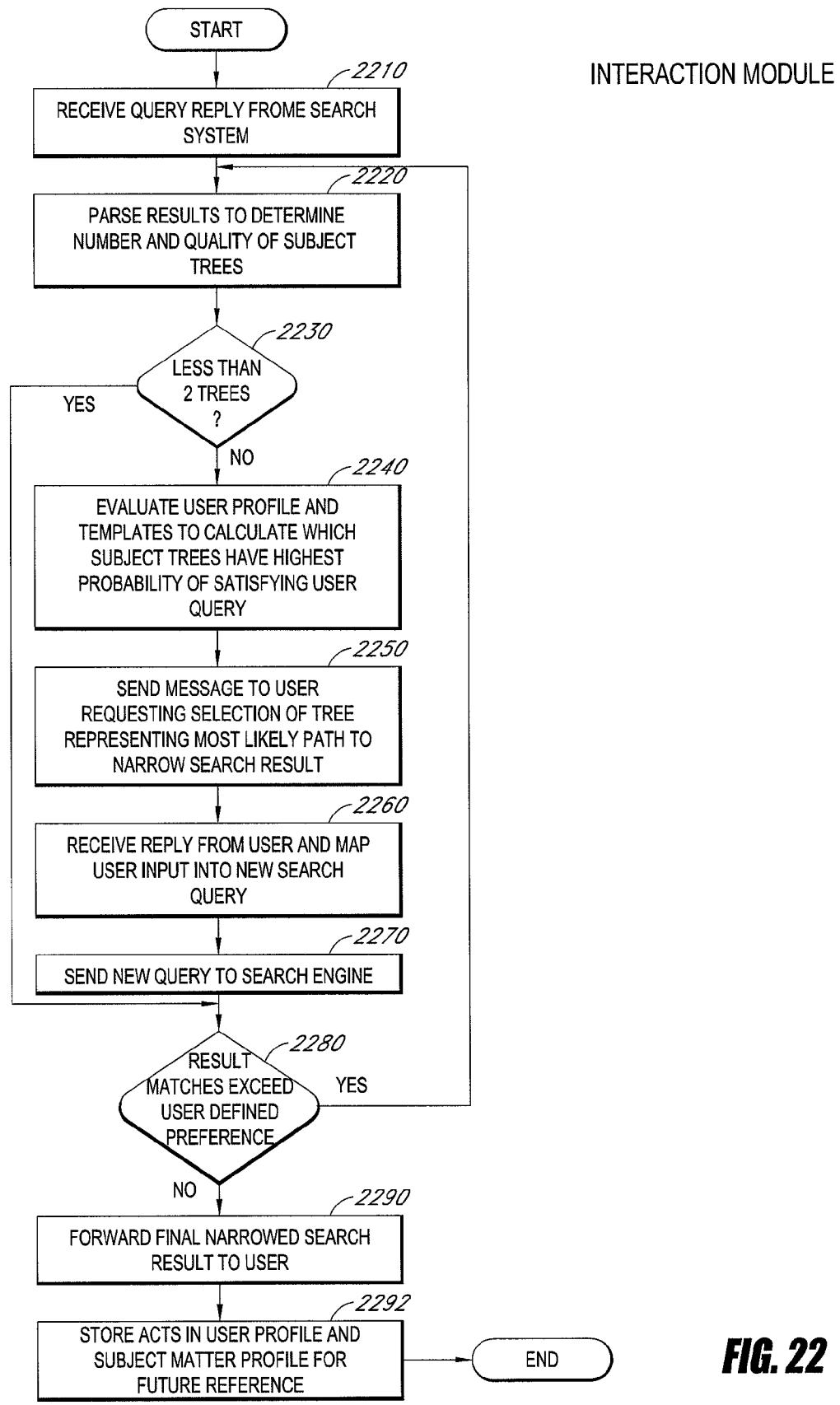
FIG. 22 is a flowchart of one embodiment of a method of interacting with a user to narrow a search result.

FIG. 22 is a flowchart of one embodiment of a method of interacting with a user to narrow a search result. The exemplary method may be performed, for example, by the interaction module as described in FIG. 6. Depending on the embodiment, certain steps of the method may be removed, merged together, or rearranged in order.

The method starts at a block 2210, where a query reply including a search result is received from a search module (e.g., the search module 690 in FIG. 6). Next at a block 2220, the result is parsed to determine the number and quality of the subject trees.

Moving to a block 2230, it is determined whether there are less than two subject trees. If the answer at block 2230 is yes, the method moves to a block 2280. If the answer at block 2230 is no, the method then moves to a block 2240.

Next at block 2240, the user profiler associated with the user issuing this query and templates are evaluated to determine which subject trees have the highest probability of satisfying the user query. Moving to a block 2250, a message is sent to the user requesting him to select one of the trees representing a path, for example, which is most likely to narrow the search result. Next at a block 2260, a reply is received from the user and a new search query is generated based on the current user query and the user reply. Moving to a block 2270, the new query is sent to the search module and the method moves back to block 2220.

At block 2280, it is determined whether the matches in the search result exceed a user-defined preference. If the answer at block 2280 is yes, the method goes back to block 2220. Otherwise, the method moves to a block 2290.

At block 2290, a final search result is forwarded to the user. The final search result may be narrower than the original search result included in the query reply from the search module.

Next at a block 2292, information related to the current search is stored in user profile and subject matter profile for future reference.

APPLICATION EXAMPLE

One example embodiment of the system would be the creation of a comprehensive, industry-wide database with full transparency. One of the main inhibitors to free trade is the imperfect availability of real-time commerce information. Referring to the domestic grocery industry as an example, many participants up and down the value chain from consumer to manufacturer make daily decisions with impartial information. A consumer who wants to purchase a list of products at the lowest possible price can rarely afford to comparison shop every product on the list. The industry exploits this fact by running promotions on certain products to draw a consumer in the door on the expectation of making up the difference with higher margins on other products.

All parties stand to gain if this system were implemented. To illustrate the point, this discussion focuses on the consumer-retailer benefits, but it will become apparent that it is equally applicable to other value chain participants as well. A service provider operating the system 400 (FIG. 4) would contact all retailers in a given region and notify them of the opportunity to make their product information directly accessible to the public in order to facilitate their shopping needs. Five retailers decide to participate and arrange to have their proprietary databases 429 connect via a network to the input management system 420. As each provider has previously registered with the service provider, they connect to the structured data entry module 620 (FIG. 6) where the system authenticates the connection and logs them into the accounting module 640 where they may be assessed a fee for using the system. As each retailer has its own proprietary system, the subject template module 630 retrieves both a template for each retailer and a template for each product group contained in the retailer's database. Products may be stored with different formats in different fields and spelled or described in different ways. Moreover, stock level and pricing may be expressed in incompatible ways. The retailer specific template directs the system into how to parse the proprietary information, and a product template similar to FIG. 8 aids the system in classification and linkage to contextual records, like manufacturer resources (recipes, photos promotions), government warnings or recent news articles about the product. The qualitative assessment module 650 evaluates each data entry for quality and records scores for the retailer, its computer system and software and the operator in charge, as outlined in FIGS. 9, 10 and 11. Finally, the context-rich mapping module 660 maps each data element using a method similar to that shown in FIG. 12 where each primary element is assigned one or more parallel records that reflect duplicate information or semantic equivalents as determined from external resources similar to that shown in FIG. 7.

The end result of the above process is a real-time knowledge repository that provides consumers with near perfect insight into what products are available on the best terms from a retailer. Moreover, the context-rich mapping and subject specific template has created associations for each product record so that consumers can instantly see which retailer is the best for their specific shopping list taking in consideration special offers from related parties, available stock, and other incentives.

A consumer might access the system 400 shown in FIG. 4 via a public search engine 436 like Google. An example search for 'peanut butter' (see FIG. 13) might take the consumer to the data request evaluation module 694 (FIG. 6) where a cookie in her browser would trigger her user account 640 and her preference for restricting searches to high-authority data sources within her zip of 92109 similar to that shown in FIG. 14. The user preferences would be forwarded to the filter module 680, combined with the search query and passed to the search module 690. The resulting matches would contain more than one category and pass the interaction module 692 a user question to choose from 'peanut spread' or 'peanut butter cookies' or 'peanut butter ice cream'. The user's response would then be forwarded back to the search module and the final result returned to the user.

CONCLUSION

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A computer-implemented method of maintaining a data cluster of records referring to a same object or phenomenon in a context-rich database, the method comprising:
    assessing, by a processor, each record of the data cluster entered by a source on a predetermined number of parameters to develop a quality score for the source, wherein the predetermined number of parameters comprises a level of diligence used to enter the data;
    assessing, by the processor, each field of a record entered by the source on parameters related to quality or performance of the data; and
    storing, by the processor, one or more scores based on the assessments so as to enhance answering requests about a portion of the database.

2. The method of claim 1, wherein the parameters related to quality or performance of the data comprise one or more of the following: completeness, integrity, and popularity.

3. The method of claim 1, additionally comprising minimizing disparities between like concepts in different records, wherein differences arise from language used, time, date, location, collection method, subject field, measurement system, or coding.

4. The method of claim 1, additionally comprising storing information about the performance for sources or other entities regarding completeness and integrity of data corresponding to the sources or other entities.

5. The method of claim 1, wherein the source comprises at least one of the following: a source organization, a source person, and a source device.

6. The method of claim 1, wherein each of the records referring to the same object or phenomenon provides a definition of the same object or phenomenon.

7. The method of claim 1, wherein the source provides unstructured data, and the unstructured data is processed with a template to allow for the unstructured data to be entered into the structure of the context-free database.

8. The method of claim 1, wherein the parameters related to quality or performance of the data comprise integrity.

9. The method of claim 1, wherein the predetermined number of parameters comprises one or more of the following: brand, model, serial number, specifications of the measurement equipment.

10. The method of claim 1, wherein the predetermined number of parameters comprises transaction data.

11. The method of claim 1, wherein the quality score for the source is determined based on past transactions associated with the source.

12. The method of claim 1, wherein the level of diligence is dependent in part on a default ontology or taxonomy and a reserved word or phrase list.

13. A computer-implemented system for maintaining a data cluster of records referring to a same object or phenomenon in a context-rich database, the system comprising:
    means, operable on a processor, for assessing each record of the data cluster entered by a source on a predetermined number of parameters to develop a quality score for the source, wherein the predetermined number of parameters comprises a level of diligence used to enter the data;
    means, operable on a processor, for assessing each field of a record entered by the source on parameters related to quality or performance of the data; and
    means, operable on a processor, for storing one or more scores based on the assessments so as to enhance answering requests about a portion of the database.

14. A computer-implemented system for maintaining a data cluster of records referring to a same object or phenomenon in a context-rich database, the system comprising:
    a memory; and
    a processor configured to:
        assess each record of the data cluster entered by a source on a predetermined number of parameters to develop a quality score for the source, wherein the predetermined number of parameters comprises a level of diligence used to enter the data;
        assess each field of a record entered by the source on parameters related to quality or performance of the data; and
        store one or more scores based on the assessments so as to enhance answering requests about a portion of the database.

* * * * *